United States Patent
Nakaya

(10) Patent No.: US 12,415,563 B2
(45) Date of Patent: Sep. 16, 2025

(54) FLOW CONTROL VALVE, DAMPER AND STEERING DEVICE

(71) Applicant: SOMIC MANAGEMENT HOLDINGS INC., Tokyo (JP)

(72) Inventor: Kazumasa Nakaya, Shizuoka (JP)

(73) Assignee: SOMIC MANAGEMENT HOLDINGS INC., Tokyo (JP)

( * ) Notice: Subject to any disclaimer, the term of this patent is extended or adjusted under 35 U.S.C. 154(b) by 470 days.

(21) Appl. No.: 17/998,825

(22) PCT Filed: Apr. 22, 2021

(86) PCT No.: PCT/JP2021/016337
§ 371 (c)(1),
(2) Date: Nov. 15, 2022

(87) PCT Pub. No.: WO2021/246081
PCT Pub. Date: Dec. 9, 2021

(65) Prior Publication Data
US 2023/0234633 A1  Jul. 27, 2023

(30) Foreign Application Priority Data

Jun. 2, 2020 (JP) ................................. 2020-096430

(51) Int. Cl.
*B62D 3/12* (2006.01)
*B62D 7/22* (2006.01)
(Continued)

(52) U.S. Cl.
CPC ............... *B62D 3/12* (2013.01); *B62D 7/228* (2013.01); *F16F 9/512* (2013.01); *F16F 15/023* (2013.01); *F16K 17/30* (2013.01)

(58) Field of Classification Search
CPC ........... B62D 3/12; B62D 7/228; F16F 9/512; F16F 15/023; F16K 17/30
See application file for complete search history.

(56) References Cited

U.S. PATENT DOCUMENTS

| 5,788,372 A | 8/1998 | Jones et al. |
| 9,975,574 B2 * | 5/2018 | Ohashi ................. F16F 1/3732 |

(Continued)

FOREIGN PATENT DOCUMENTS

| GB | 2122305 A | 1/1984 |
| JP | 02-51676 A | 2/1990 |

(Continued)

OTHER PUBLICATIONS

Extended European Search Report issued on Jul. 18, 2024 for the corresponding European Patent Application No. 21817390.4.

(Continued)

*Primary Examiner* — Faye M Fleming
(74) *Attorney, Agent, or Firm* — Rankin, Hill & Clark LLP

(57) ABSTRACT

Provide is a steering device capable of absorbing great impact force, a damper applicable to the steering device, and a flow control valve applicable to the damper. The steering device 100 includes a damper 120 between a rack bar 103 and a rack end 106. In the damper 120, an inner chamber 121 is formed at an outer peripheral portion of a socket main body 107, and an integral displacement body 130 is slidably fitted onto the outer peripheral portion. The integral displacement body 130 is, at an inner peripheral portion thereof, formed with a circular ring-shaped flow control valve 140. The flow control valve 140 is provided with a first flow control valve 150. The first flow control valve 150 includes a second flow body 156 that approaches or separates from a first flow body 153. In the second flow body 156, a second flow hole 157 is formed at a position shifted from a first flow hole 154 formed at the first flow body 153, and a second hole diameter restriction portion 158 is formed so as to close the first flow hole 154.

15 Claims, 14 Drawing Sheets

(51) Int. Cl.
    *F16F 9/512*     (2006.01)
    *F16F 15/023*     (2006.01)
    *F16K 17/30*     (2006.01)

(56)     References Cited

U.S. PATENT DOCUMENTS

| | | | |
|---|---|---|---|
| 12,145,677 B2 * | 11/2024 | Nakaya | B62D 7/228 |
| 12,297,687 B2 * | 5/2025 | Enders | F16F 9/3271 |
| 2003/0075845 A1 | 4/2003 | Krammer | |
| 2009/0250893 A1 | 10/2009 | Kohls et al. | |

FOREIGN PATENT DOCUMENTS

| | | | |
|---|---|---|---|
| JP | 05-034082 U | 5/1993 | |
| JP | 2011-185388 A | 9/2011 | |
| JP | 2016-097840 A | 5/2016 | |
| JP | 2017-096433 A | 6/2017 | |
| JP | 2019-002434 A | 1/2019 | |

OTHER PUBLICATIONS

Chinese Office Action issued on Feb. 22, 2025 against the corresponding Chinese Patent Application No. 202180032946.4 and its English machine translation.
International Search Report mailed on Jun. 29, 2021 for PCT/JP2021/016337.

* cited by examiner

FLOW CONTROL VALVE, DAMPER AND STEERING DEVICE

TECHNICAL FIELD

The present invention relates to a flow control valve provided at a flow path, in which fluid flows, to control the flow of the fluid by causing the fluid to flow with a limitation on the flow of the fluid, a damper including the flow control valve, and a steering device including the damper.

BACKGROUND ART

Typically, in a four-wheeled self-propelled vehicle, a steering device is provided as a mechanical device for transmitting driver's steering operation to wheels to steer the self-propelled vehicle. In this case, in the steering device, an impact absorption member is provided to absorb strong impact generated, for example, when the self-propelled vehicle runs over a curbstone. For example, in a steering device disclosed in Patent Literature 1 below, an impact absorption member made of a rubber material and a metal material is provided between a rack housing covering a rack shaft and a tie rod connected to a wheel. With this configuration, strong impact generated, for example, when a self-propelled vehicle runs over a curbstone can be absorbed.

CITATION LIST

Patent Literature

PATENT LITERATURE 1: JP-A-2016-97840

SUMMARY OF INVENTION

However, in the steering device disclosed in Patent Literature 1 above, the impact absorption member is made of rubber or synthetic resin. For this reason, there is a problem that the magnitude of impact absorbable is small.

The present invention has been made in order to cope with the above-described problem. An object of the present invention is to provide a steering device capable of absorbing great impact force, a damper applicable to the steering device, and a flow control valve applicable to the damper.

In order to achieve the object described above, a feature of the present invention is a flow control valve provided at a flow path, in which fluid flows, to control a flow of the fluid by causing the fluid to flow with a limitation on the flow of the fluid. The flow control valve includes: a first flow body including a first flow hole through which the fluid flows; a second flow body arranged so as to face the first flow body and including a second flow hole through which the fluid flows; and a separation elastic body that produces an elastic force of separating the first flow body and the second flow body from a position at which the first flow body and the second flow body contact each other. In the flow control valve, at least one of the first flow body or the second flow body includes a hole diameter restriction portion that closes at least part of at least one of the second flow hole or the first flow hole when the first flow body and the second flow body contact each other.

According to the feature of the present invention configured as described above, in the flow control valve, at least one of the first flow body or the second flow body each having the first flow hole and the second flow hole in which the fluid flows includes the hole diameter restriction portion that closes at least part of at least one of the second flow hole or the first flow hole when the first flow body and the second flow body contact each other. With this configuration, in the flow control valve according to the present invention, in a case where great external force acts on between the first flow body and the second flow body, at least part of the first flow hole and the second flow hole is closed by the hole diameter restriction portion, and the flow of the fluid is limited accordingly. Thus, the steering device can be configured to damp the great external force and absorb great impact force.

In this case, in the flow control valve of the present invention, the hole diameter of the second flow hole and elastic force of the separation elastic body are selected as necessary so that a condition for closing the first flow hole and the second flow hole, i.e., the magnitude of damping force and a condition for generating the damping force, can be freely adjusted. Note that each hole diameter of the first flow hole and the second flow hole includes shapes other than a circular sectional shape (including an oval shape), such as a quadrangular shape, a polygonal shape, or various other irregular shapes.

Further, another feature of the present invention is the flow control valve described above, in which the hole diameter restriction portion is provided only at one of the first flow body or the second flow body.

According to another feature of the present invention configured as described above, in the flow control valve, the hole diameter restriction portion is provided only at one of the first flow body or the second flow body. Thus, the structure of the flow control valve and a step of manufacturing the flow control valve can be simplified.

Further, still another feature of the present invention is the flow control valve described above, in which the hole diameter restriction portion is provided at each of the first flow body and the second flow body.

According to still another feature of the present invention configured as described above, in the flow control valve, the hole diameter restriction portion is provided at each of the first flow body and the second flow body. Thus, reliability of control of the flow of the fluid can be improved.

Further, still another feature of the present invention is the flow control valve described above, in which the hole diameter restriction portion is formed so as to fully close at least one of the second flow hole or the first flow hole.

According to still another feature of the present invention configured as described above, in the flow control valve, the hole diameter restriction portion is formed so as to fully close at least one of the second flow hole or the first flow hole. Thus, the steering device can be configured to damp great external force and absorb great impact force.

Further, still another feature of the present invention is the flow control valve which includes a second flow body housing portion that movably houses the second flow body on a second flow body side with respect to the first flow body, in which the separation elastic body is provided between the first flow body and the second flow body in the second flow body housing portion.

According to still another feature of the present invention configured as described above, in the flow control valve, the second flow body is slidably housed in the second flow body housing portion. Thus, the second flow body can stably approach or separates from the first flow body.

Further, still another feature of the present invention is the flow control valve described above, in which the second flow body is, at an opening of the second flow hole on a side opposite to the first flow body, formed in such a tapered shape that a hole size decreases from an opening side toward a far side.

According to still another feature of the present invention configured as described above, in the flow control valve, the second flow body is, at the opening of the second flow hole on the side opposite to the first flow body, formed in such a tapered shape that the hole size decreases from the opening side toward the far side. Thus, as compared to a case where the second flow hole is formed straight, the fluid can easily flow into the second flow hole, and activation of the flow control valve can be stabilized. Moreover, in the flow control valve, the fluid can easily flow into the second flow hole, and a flow speed can be increased. Thus, the tapered portion receives strong pressing force from the fluid so that the second flow body can easily displace to a first flow body side.

Further, still another feature of the present invention is the flow control valve described above which further includes a one-way valve that causes the fluid to flow in a flow path different from the first flow body and the second flow body, in which the one-way valve allows the flow of the fluid from a first flow body side to a second flow body side, and blocks the flow of the fluid from the second flow body side to the first flow body side.

According to still another feature of the present invention configured as described above, the flow control valve includes, in addition to the first flow body and the second flow body, the one-way valve allowing the flow of the fluid from the first flow body side to the second flow body side and blocking the flow of the fluid from the second flow body side to the first flow body side. Thus, in the flow control valve according to the present invention, in a case where the fluid flows from the second flow body side to the first flow body side, the fluid actively flows in the second flow body so that the second flow body can easily displace. Moreover, in the flow control valve according to the present invention, in a case where the fluid flows from the first flow body side to the second flow body side, the fluid can more efficiently flow from the first flow body side to the second flow body side by the one-way valve in addition to the first flow body and the second flow body.

Further, still another feature of the present invention is the flow control valve described above which further includes a flow restriction valve that causes the fluid to flow with a limitation on the flow of the fluid in a flow path different from the first flow body and the second flow body, and the flow restriction valve causes the fluid to flow with the limitation on the flow of the fluid between the first flow body side and the second flow body side.

According to still another feature of the present invention configured as described above, the flow control valve includes, in addition to the first blow body and the second flow body, the flow restriction valve that causes the fluid to flow with the limitation on the flow of the fluid between the first flow body side and the second flow body side. Thus, when the fluid flows between the first flow body side and the second flow body side, the flow control valve having basic damping force can be configured in addition to the first flow body and the second flow body.

The present invention can be implemented not only as the invention relating to the flow control valve, but also as the invention relating to a damper including the flow control valve and a steering device including the damper.

Specifically, in a damper including an inner chamber forming body forming an inner chamber housing fluid in a liquid-tight manner and damping external force received by the fluid by limiting a flow of the fluid, it is preferred that the flow control valve according to any one of claims 1 to 8 is provided, the flow control valve causing the fluid to flow with the limitation on the flow of the fluid. According to this configuration, features and advantageous effects similar to those of the above-described flow control valve can be expected from the damper according to the present invention.

In this case, it is preferred that: the damper further includes a return elastic body that provides an elastic force of causing the fluid to flow from the first flow body side to the second flow body side in the flow control valve; the flow control valve is, in the inner chamber, provided displaceable relative to the inner chamber; and the return elastic body provides the elastic force to one of the inner chamber forming body or the flow control valve to displace the one of the inner chamber forming body or the flow control valve relative to the other one of the inner chamber forming body or the flow control valve.

According to this configuration, in the damper according to the present invention, the return elastic body provides the elastic force to one of the inner chamber forming body or the flow control valve to displace the one of the inner chamber forming body or the flow control valve relative to the other one of the inner chamber forming body or the flow control valve. With this configuration, in the damper according to the present invention, in a case where the fluid does not flow from the second flow body side to the first flow body side, the flow control valve is displaced relative to the inner chamber forming body so that the flow control valve can be constantly at a position at which the fluid can flow from the first flow body side to the second flow body side, i.e., an activation start position for producing a damping function of the flow control valve.

Further, in this case, it is preferred that: the damper further includes an integral displacement body that displaces integrally with the flow control valve relative to the inner chamber; the inner chamber forming body is formed in a solid bar shape or a tubular shape; the inner chamber is formed in a circular-ring tubular shape outside the inner chamber forming body; the flow control valve is formed at a ring-shaped valve support to be fitted in the circular-ring tubular inner chamber; and the integral displacement body is formed in a tubular shape slidably fitted onto the inner chamber forming body.

According to this configuration, in the damper according to the present invention, the inner chamber is formed outside the inner chamber forming body. Thus, the inner chamber forming body itself can be formed in the solid bar shape or the tubular shape, and the number of variations in damper installation can be increased. Note that the phrase of the inner chamber being formed in the circular-ring tubular shape means a circular-ring tubular shape formed with a circular ring-shaped sectional shape and extending in a tubular body shape.

Further, in this case, it is preferred that: the damper further includes an integral displacement body that displaces integrally with the flow control valve relative to the inner chamber; the inner chamber forming body is formed in a tubular shape; the inner chamber is formed in a circular-ring tubular shape inside the inner chamber forming body; the flow control valve is formed at a ring-shaped valve support to be fitted in the circular-ring tubular inner chamber; and the integral displacement body is formed in a solid bar shape or a tubular shape to be slidably fitted in the inner chamber forming body.

According to this configuration, in the damper according to the present invention, the inner chamber is formed inside the inner chamber forming body. Thus, the integral displacement body itself can be formed in the solid bar shape or the tubular shape, and the number of variations in damper installation can be increased.

Further, specifically, it is only required that the steering device, which includes a steering shaft formed so as to extend in a bar shape and rotated by operation of a steering wheel, a rack bar formed so as to extend in a rod shape and converting rotary motion of the steering shaft into reciprocating motion in an axis direction to transmit the reciprocating motion, an intermediate coupling body coupled to each end portion of the rack bar to directly or indirectly couple a wheel targeted for steering to the each end portion, and a rack housing covering the rack bar, is configured such that the steering device includes the damper according to any one of claims 9 to 12, and the damper is provided between the rack housing and the rack bar or the intermediate coupling body to absorb impact from the wheel. According to this configuration, features and advantageous effects similar to those of the above-described flow control valve and the above-described damper can be expected from the steering device according to the present invention.

In this case, it is preferred that: the steering device includes the damper according to claim 11; the inner chamber forming body is formed at the intermediate coupling body; and the integral displacement body is formed at such a position that the integral displacement body contacts or separates from the rack housing by the reciprocating motion of the rack bar.

According to this configuration, in the steering device according to the present invention, the inner chamber forming body is formed at the intermediate coupling body such as a tie rod or a rack end, and the integral displacement body is formed at such a position that the integral displacement body contacts or separates from the rack housing by the reciprocating motion of the rack bar in the inner chamber forming body. That is, in the steering device according to the present invention, the damper is provided at the intermediate coupling body such as the tie rod or the rack end so that a damper maintenance or replacement process can be easily performed.

In this case, it is preferred that: the steering device includes the damper according to claim 12; the inner chamber forming body is formed at an end portion of the rack housing; and the rack bar or the intermediate coupling body penetrates the integral displacement body; and the integral displacement body is formed at such a position that the rack bar or the intermediate coupling body contacts or separates from the integral displacement body by the reciprocating motion of the rack bar.

According to this configuration, in the steering device according to the present invention, the inner chamber forming body is formed at the end portion of the rack housing, the rack bar or the intermediate coupling body (e.g., the tie rod or the rack end) penetrates the integral displacement body, and the integral displacement body is formed at such a position that the rack bar or the tie rod contacts or separates from the integral displacement body by the reciprocating motion of the rack bar. Thus, in the steering device according to the present invention, the damper is provided at the rack housing so that the intermediate coupling body such as the tie rod or the rack end can be decreased in weight.

DESCRIPTION OF EMBODIMENTS

First Embodiment

Figure 1:
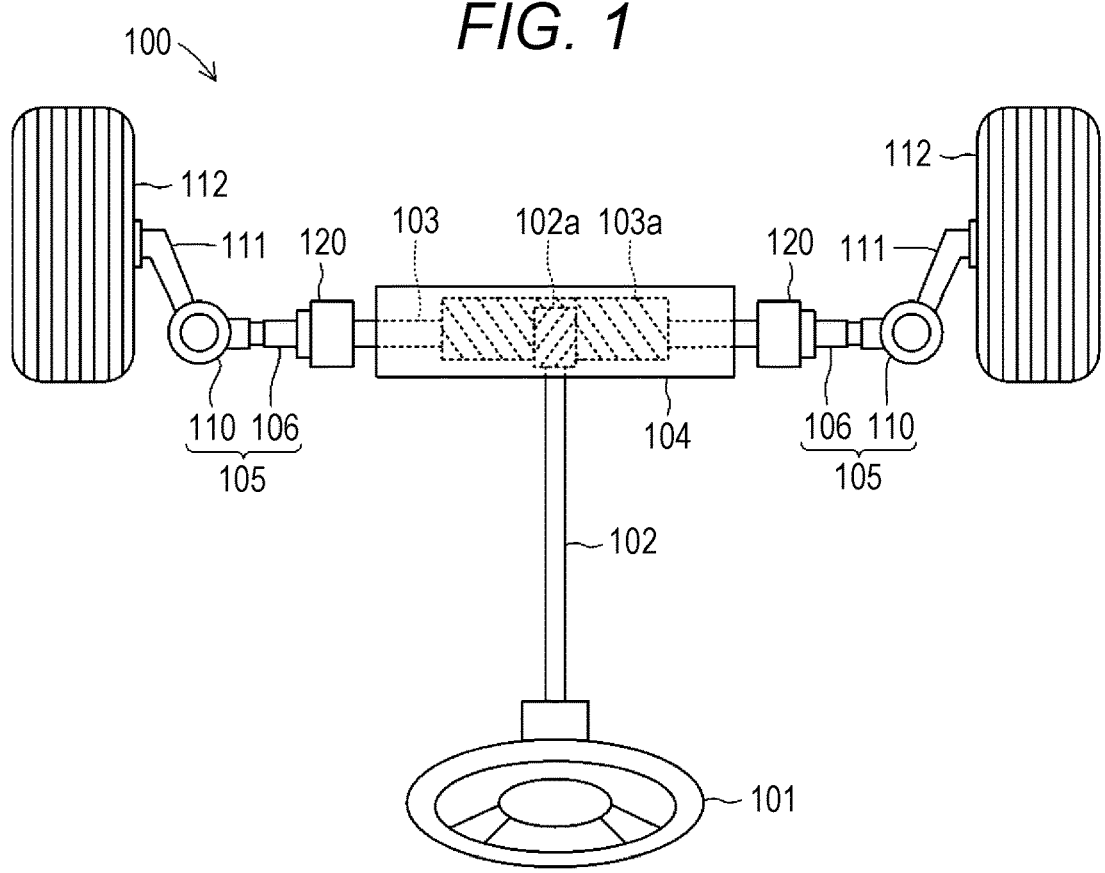
FIG. 1 is a schematic view for describing the outline of an entire configuration of a steering device according to a first embodiment of the present invention.
Figure 2:
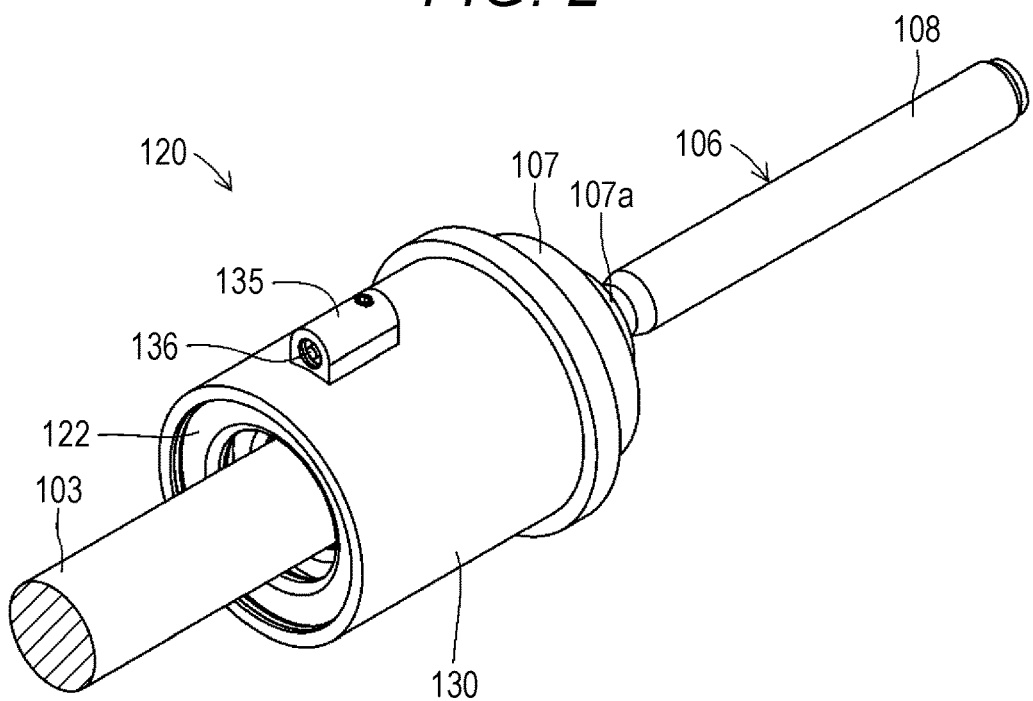
FIG. 2 is a perspective view showing the outline of an external configuration of a damper according to the first embodiment of the present invention, the damper forming the steering device shown in FIG. 1.
Figure 3:
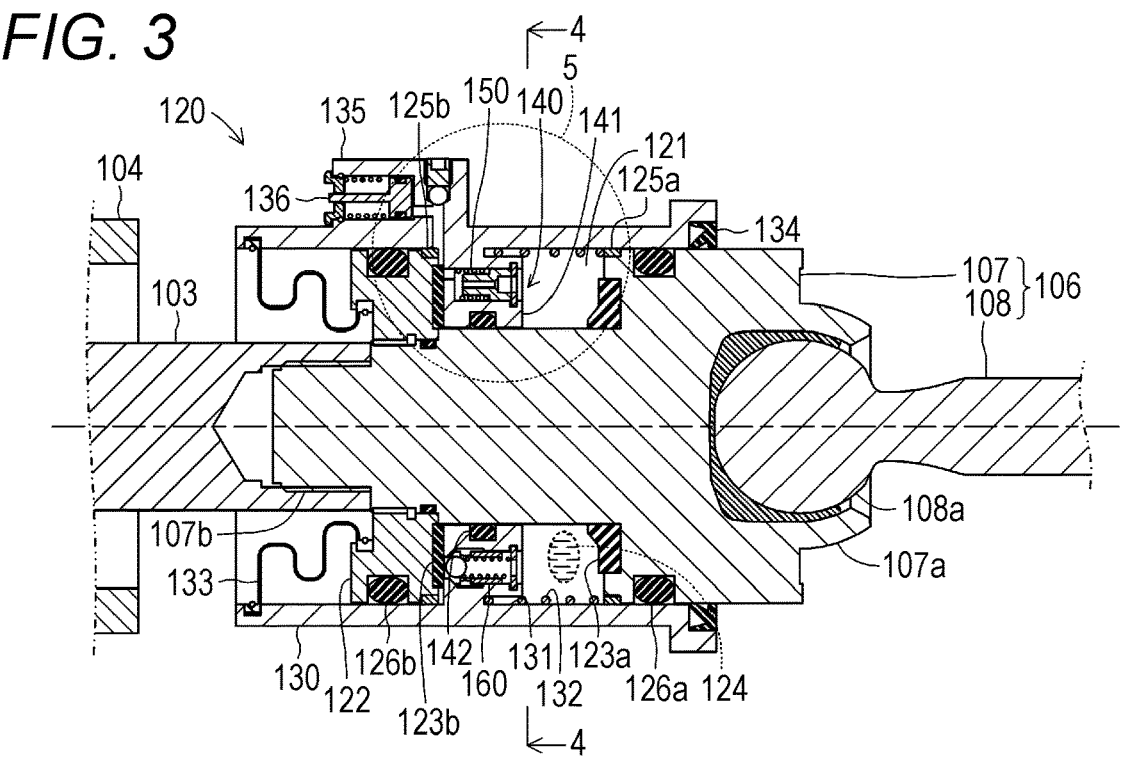
FIG. 3 is a sectional view showing the outline of an internal configuration of the damper shown in FIG. 2.
Figure 4:
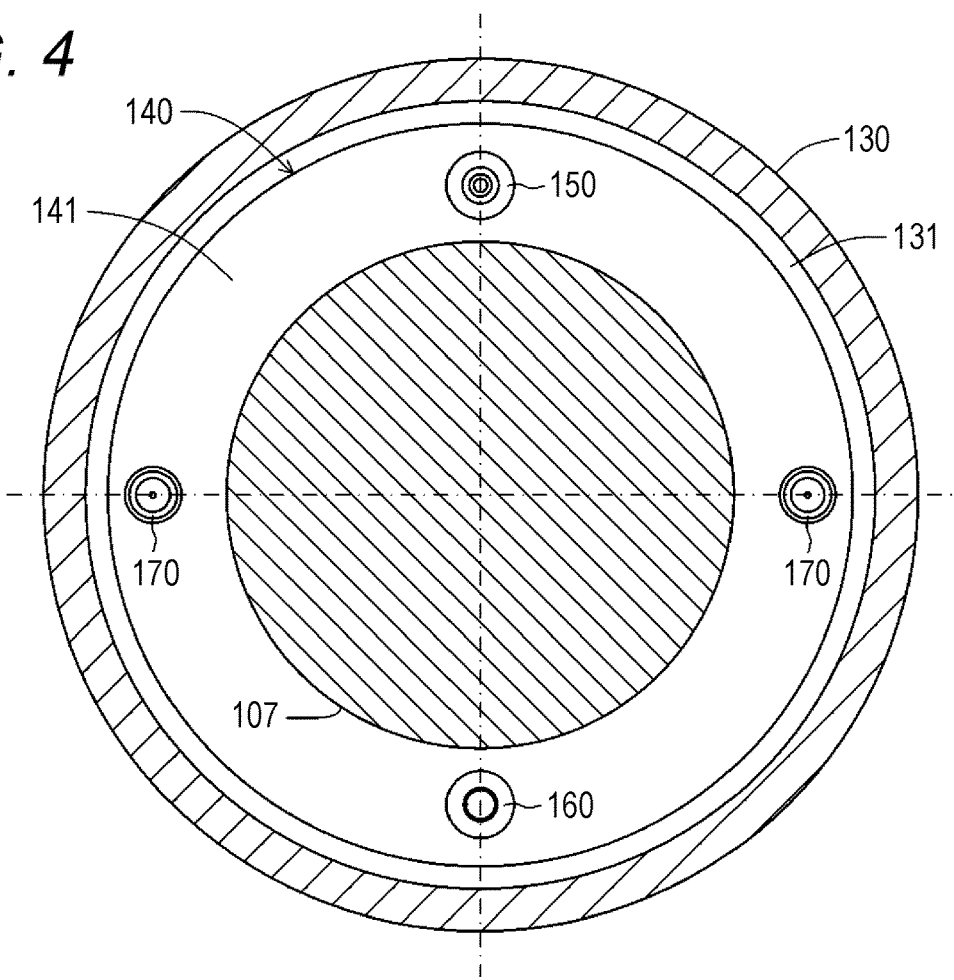
FIG. 4 is a sectional view of an integral displacement body and a socket main body along a 4-4 line shown in FIG. 3.
Figure 5:
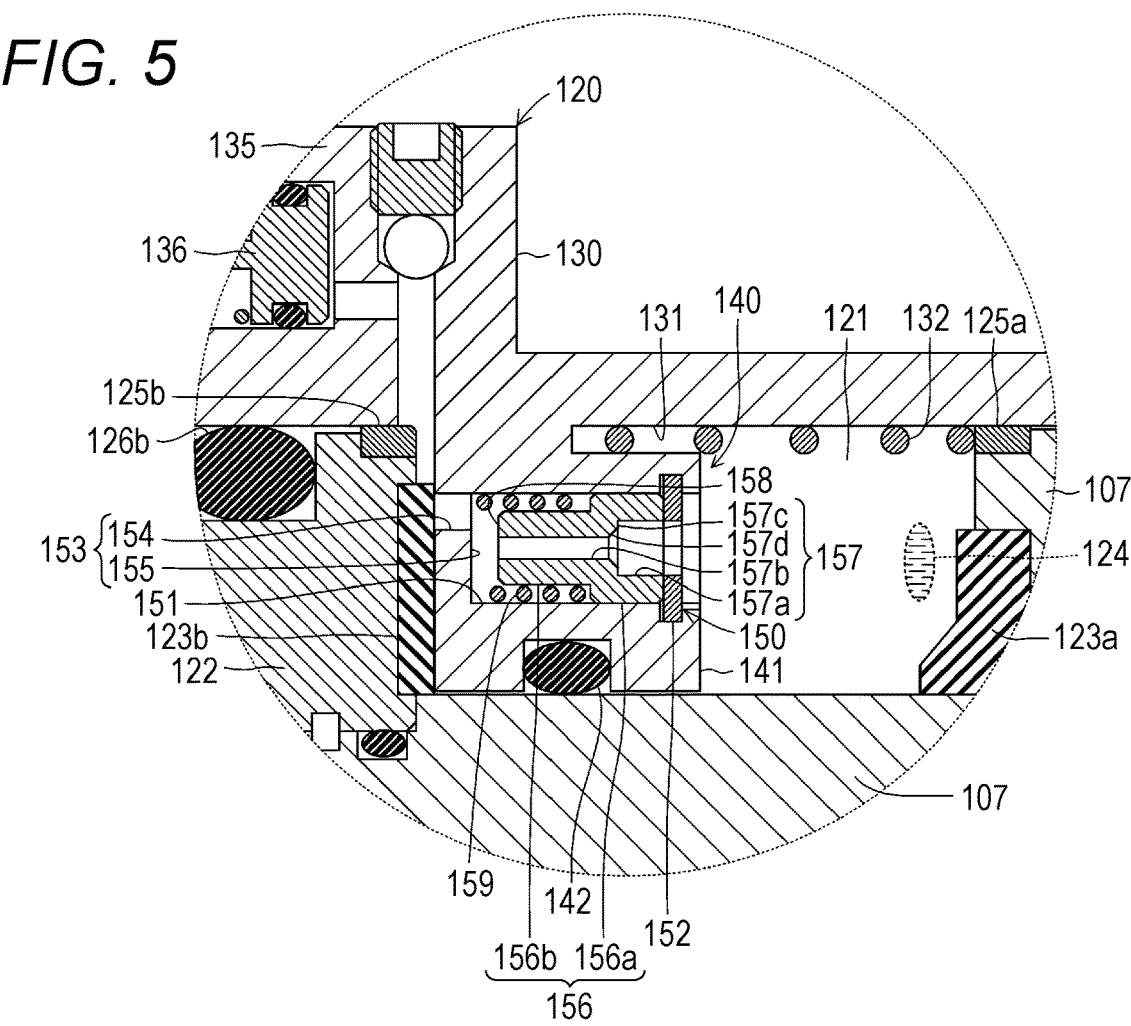
FIG. 5 is a partially-enlarged view showing details of the structure of the damper of FIG. 3 in a dashed circle 5.

Hereinafter, a first embodiment as one embodiment of a steering device including flow control valves and dampers according to the present invention will be described with reference to the drawings. FIG. 1 is a schematic view for describing the outline of an entire configuration of a steering device 100 according to the first embodiment of the present invention. FIG. 2 is a perspective view showing the outline of an external configuration of a damper 120 according to the first embodiment of the present invention, the damper 120 forming the steering device 100 shown in FIG. 1. FIG. 3 is a sectional view showing the outline of an internal configuration of the damper 120 shown in FIG. 2. FIG. 4 is a sectional view of an integral displacement body 130 and a socket main body 107 along a 4-4 line shown in FIG. 3. FIG. 5 is a partially-enlarged view showing details of the structure of the damper 120 of FIG. 3 in a dashed circle 5.

The steering device 100 is a mechanical device for steering two front wheels (or rear wheels) of a four-wheeled self-propelled vehicle (not shown) right and left.

(Configuration of Steering Device 100)

The steering device 100 includes a steering wheel 101. The steering wheel 101 is an operator (i.e., a handle) for manually operating a travelling direction by a driver of the self-propelled vehicle. The steering wheel 101 is formed in such a manner that a resin material or a metal material is formed in a circular ring shape. A steering shaft 102 is coupled to the steering wheel 101.

The steering shaft 102 is a component formed in a bar shape and rotating about an axis according to clockwise or counterclockwise rotary operation of the steering wheel 101. The steering shaft 102 is formed in such a manner that one or more metal bar bodies are coupled through, e.g., a universal joint. The steering wheel 101 is coupled to one end portion of the steering shaft 102, and a pinion gear 102a is formed at the other end portion and a rack bar 103 is coupled to the other end portion.

The rack bar 103 is a component formed in a bar shape and reciprocatably displacing in an axis direction to transmit a force of steering each of two wheels 112 and an amount of steering each of two wheels 112 to a corresponding one of knuckle arms 111. The rack bar 103 is made of a metal material. In this case, a rack gear 103a is formed at part of the rack bar 103, and engages with the pinion gear 102a of the steering shaft 102. That is, the pinion gear 102a and the rack gear 103a form a rack-and-pinion mechanism (a steering gear box) converting rotary motion of the steering shaft 102 into linear reciprocating motion of the rack bar 103.

Both end portions of the rack bar 103 in the axis direction are exposed through a rack housing 104 in a state in which the rack-and-pinion mechanism is covered with the rack housing 104. The wheels 112 are each coupled to both end portions of the rack bar 103 exposed through the rack housing 104 through intermediate coupling bodies 105 and the knuckle arms 111.

The rack housing 104 is a component for covering and protecting a main portion of the rack bar 103, such as the rack-and-pinion mechanism. The rack housing 104 is formed in such a manner that a metal material is formed in a cylindrical shape. The rack housing 104 is attached in a fixed manner to a chassis (not shown) of the self-propelled vehicle.

The intermediate coupling body 105 is a component for transmitting the steering force and the steering amount transmitted from the rack bar 103 to the knuckle arm 111. The intermediate coupling body 105 mainly includes a rack end 106 and a tie rod 110. The rack end 106 is a component movably coupling the tie rod 110 to a tip end portion of the rack bar 103 and formed with the damper 120. The rack end 106 mainly includes the socket main body 107 and a stud body 108.

The socket main body 107 is a component movably coupling the stud body 108 to the tip end portion of the rack bar 103 and formed with the damper 120. The socket main body 107 is formed in such a manner that a metal material is formed in a round bar shape. A ball holding portion 107a is formed at one (the right side as viewed in the figure) end portion of the socket main body 107, and an external thread portion 107b to be fitted in the tip end portion of the rack bar 103 is formed at the other (the left side as viewed in the figure) end portion. The ball holding portion 107a is formed in such a recessed spherical shape that the ball holding portion 107a is slidably fitted onto a ball portion 108a of the stud body 108 to hold the ball portion 108a. The damper 120 is formed between the ball holding portion 107a and the external thread portion 107b of the socket main body 107.

The stud body 108 is a component for movably coupling the tie rod 110 to the socket main body 107. The stud body 108 is formed in such a manner that a metal material is formed in a round bar shape. The spherical ball portion 108a is formed at one (the left side as viewed in the figure) end portion of the stud body 108, and an external thread portion (not shown) to be fitted in an end portion of the tie rod 110 is formed at the other (the right side as viewed in the figure) end portion.

The tie rod 110 is a component movably coupling the knuckle arm 111 to a tip end portion of the rack end 106. The tie rod 110 is formed in such a manner that a ball joint is movably attached to a tip end portion of a tie rod main body extending in a bar shape. The knuckle arm 111 is a metal component for holding the wheel 112 on the tie rod 110 to transmit the steering force and the steering amount transmitted from the tie rod 110 to the wheel 112. The knuckle arm 111 is formed in such a shape that multiple bar-shaped bodies extend from the periphery of a cylindrical portion. The wheels 112 are a pair of right and left components rolling on a rod surface such that the self-propelled vehicle moves back and forth. The wheel 112 is formed in such a manner that a rubber tire is attached to the outside of a metal wheel.

The damper 120 is a tool for absorbing strong pressing force (impact) transmitted from the wheel 112. The damper 120 is formed at each of the right and left intermediate coupling bodies, more specifically each of the right and left socket main bodies 107. The damper 120 includes an inner chamber 121.

The inner chamber 121 is a portion where fluid 124 is housed in a liquid-tight manner. The inner chamber 121 is, on an outer peripheral portion of the socket main body 107, formed in a circular-ring tubular shape cut out in a recessed shape along a circumferential direction and extending in the axis direction. That is, the socket main body 107 is equivalent to an inner chamber forming body according to the present invention. Of the inner chamber 121, each of a bottom portion and one (the right side as viewed in the figure) end portion in the axis direction of the socket main body 107 is, in the present embodiment, formed by the socket main body 107 itself, and the other (the left side as viewed in the figure) end portion in the axis direction is formed by a wall forming body 122. The outside of the inner chamber 121 is covered with the integral displacement body 130.

The wall forming body 122 is a component for forming the left wall portion of the inner chamber 121 as viewed in the figure. The wall forming body 122 is formed in such a manner that a metal material is formed in a circular ring shape. The wall forming body 122 is fitted onto an outer peripheral surface of the socket main body 107 on the other (the left side as viewed in the figure) side in the axis direction, and is integrated with the socket main body 107. At both end portions of the inner chamber 121 in the axis direction of the socket main body 107, buffers 123*a*, 123*b* made of elastomer such as urethane resin and including elastic bodies are provided. In this case, the buffer 123*a* is formed thicker than the buffer 123*b*.

The fluid 124 is a substance for providing resistance to a flow control valve 140 sliding in the inner chamber 121 such that the damper function of the damper 120 works. The inner chamber 121 is filled with the fluid 124. The fluid 124 includes a liquid, gel, or semisolid substance having viscosity according the specifications of the damper 120 and fluidity. In this case, the viscosity of the fluid 124 is selected as necessary according to the specifications of the damper 120. In the present embodiment, the fluid 124 includes oil such as mineral oil or silicone oil. Note that the fluid 124 is hatched in a dashed circle in FIGS. 3 and 5 (the same also applies to FIGS. 9 and 12 to 15).

Sliding bushes 125*a*, 125*b* are each fitted onto the outer peripheral surfaces of the socket main body 107 and the wall forming body 122 on both sides of the inner chamber 121 in the axis direction of the socket main body 107. The sliding bush 125*a*, 125*b* is a component for smoothly reciprocatably sliding the integral displacement body 130 in the axis direction of the socket main body 107. The sliding bush 125*a*, 125*b* is formed in such a manner that a metal material is formed in a circular ring shape having a slightly-larger outer diameter than the outer diameter of the socket main body 107.

Seal rings 126*a*, 126*b* made of an elastomer material such as a rubber material and including elastic bodies are each fitted onto the outer peripheral surfaces of the socket main body 107 and the wall forming body 122 on the opposite side of these sliding bushes 125*a*, 125*b* from the inner chamber 121. These seal rings 126*a*, 126*b* prevent leakage of the fluid 124 from the inner chamber 121 when the integral displacement body 130 slidably displaces relative to the socket main body 107.

The integral displacement body 130 is a component covering the outside of the inner chamber 121 in a radial direction and formed with the flow control valve 140. The integral displacement body 130 is formed in such a manner that a metal material is formed in a cylindrical shape. Specifically, the integral displacement body 130 is formed in such a cylindrical shape that the integral displacement body 130 is slidably fitted onto the outer peripheral surface of the socket main body 107. In this case, the integral displacement body 130 is formed with such a length that the integral displacement body 130 projects from a rack-housing-104-side end portion of the socket main body 107.

The flow control valve 140 is formed so as to project from a center portion of an inner peripheral portion of the integral displacement body 130 in the axis direction. An elastic body holding portion 131 is formed between the flow control valve 140 and an inner peripheral surface of the integral displacement body 130. A dust boot 133 and a dust seal 134 are each provided at both end portions of the inner peripheral portion of the integral displacement body 130 in the axis direction.

The elastic body holding portion 131 is a portion housing one of both end portions of a return elastic body 132. The elastic body holding portion 131 is formed in a circular ring shape between the inner peripheral surface of the integral displacement body 130 and the flow control valve 140. The return elastic body 132 is a component for elastically pressing the flow control valve 140 to the left end portion of the inner chamber 121 as viewed in the figure. The return elastic body 132 includes a metal coil spring. One (the left side as viewed in the figure) end portion of the return elastic body 132 is housed in the elastic body holding portion 131 to elastically press the integral displacement body 130, and the other (the right side as viewed in the figure) end portion elastically presses the outer peripheral portion of the socket main body 107 through the sliding bush 125*a*.

The dust boot 133 is a component for preventing dust from entering the integral displacement body 130 from a rack housing 104 side which is one (the left side as viewed in the figure) of both end portions of the integral displacement body 130. The dust boot 133 is formed in such a manner that an elastomer material such as a rubber material is formed in a cylindrical shape. One end portion of the dust boot 133 is connected to the end portion of the integral displacement body 130, and the other end portion is connected to the wall forming body 122. Note that the dust boot 133 is not shown in FIG. 2.

The dust seal 134 is, as in the dust boot 133, a component preventing dust from entering the integral displacement body 130 from a stud body 108 side which is the other (the right side as viewed in the figure) one of both end portions of the integral displacement body 130. The dust seal 134 is formed in such a manner that an elastomer material such as a rubber material is formed in a circular ring shape. The dust seal 134 is fitted in a groove cut out in a circular ring shape at the end portion of the integral displacement body 130.

An accumulator housing portion 135 is formed at an outer peripheral portion of the integral displacement body 130. The accumulator housing portion 135 is a tubular portion for housing an accumulator 136 in a liquid-tight manner. The accumulator housing portion 135 is formed so as to project onto an outer peripheral surface of the integral displacement body 130 and extend in a longitudinal direction of the integral displacement body 130. One end portion of the accumulator housing portion 135 communicates with the inner chamber 121 on a first flow body 153 side, and the other end portion is sealed with a plug.

The accumulator 136 is a tool compensating for a volume change in the fluid 124 in the inner chamber 121 due to expansion or contraction caused by a temperature change. The accumulator 136 is configured to house a piston reciprocatably sliding in the accumulator housing portion 135 in a state in which the piston is elastically pressed to an inner chamber 121 side by a coil spring.

The flow control valve 140 is a tool causing the fluid 124 to flow with a limitation on the flow of the fluid 124 in the inner chamber 121 to control the flow of the fluid 124, thereby generating damping force of the damper 120. The flow control valve 140 mainly includes each of a valve support 141, a first flow control valve 150, a second flow control valve 160, and third flow control valves 170.

The valve support 141 is a portion formed with each of the first flow control valve 150, the second flow control valve 160, and the third flow control valves 170. The valve support 141 is formed in a flat-plate circular ring shape projecting inward from the inner peripheral portion of the integral displacement body 130. An inner peripheral portion of the valve support 141 is formed with a smooth cylindrical surface such that the valve support 141 slides on the bottom portion of the inner chamber 121 in a liquid-tight manner, and a seal ring 142 including an elastic body is fitted in such an inner peripheral portion.

The first flow control valve 150 is a valve functioning as a trigger for generating the maximum damping force when strong impact force acts on the damper 120. The first flow control valve 150 mainly includes each of a second flow body housing portion 151, a first flow body 153, a second flow body 156, and a separation elastic body 159. The second flow body housing portion 151 is a portion slidably housing the later-described second flow body 156. The second flow body housing portion 151 is formed in a bottomed tubular shape constantly opened at one (the right side as viewed in the figure) end portion of the valve support 141.

In this case, the second flow body housing portion 151 is formed so as to be constantly opened at one of two side surfaces of the valve support 141 on the front side when the integral displacement body 130 slidably displaces against elastic force of the return elastic body 132 relative to the socket main body 107. A retaining ring 152 is fitted in a ring-shaped groove formed close to an opening at an inner peripheral surface of the second flow body housing portion 151. The retaining ring 152 is a component for preventing detachment of the second flow body 156 housed in the second flow body housing portion 151. The retaining ring 152 includes a metal C-shaped ring body.

The first flow body 153 is a portion for controlling the flow of the fluid 124 in cooperation with the second flow body 156. The first flow body 153 mainly includes each of a first flow hole 154 and a first hole diameter restriction portion 155. The first flow hole 154 is a through-hole causing the fluid 124 to flow, and is formed at a bottom portion of the second flow body housing portion 151. In this case, the first flow hole 154 is formed at an edge portion of the bottom portion eccentric with respect to the center line of the second flow body housing portion 151. That is, the second flow body housing portion 151 is opened larger on one side (a buffer 123a side) of the inner chamber 121, and due to the first flow hole 154, is opened smaller on the other side (a buffer 123b side).

The first hole diameter restriction portion 155 is a portion blocking the flow of the fluid 124 in a second flow hole 157. The first hole diameter restriction portion 155 is formed in a wall shape at the periphery of the first flow hole 154. Moreover, the first hole diameter restriction portion 155 is formed at a position facing the second flow hole 157 so as to fully close the second flow hole 157 of the second flow body 156 when the second flow body 156 has contacted the first flow body 153. In the present embodiment, the first hole diameter restriction portion 155 is formed by the bottom portion of the second flow body housing portion 151.

The second flow body 156 is a component for controlling the flow of the fluid 124 in cooperation with the first flow body 153. The second flow body 156 is formed in such a manner that a metal material is formed in a cylindrical shape. In this case, the second flow body 156 includes a large-diameter portion 156a sliding on the inner peripheral surface of the second flow body housing portion 151 and a small-diameter portion 156b having a smaller diameter than that of the large-diameter portion 156a. Each of the second flow hole 157 and a second hole diameter restriction portion 158 is formed at the second flow body 156.

The second flow hole 157 is a through-hole causing the fluid 124 to flow. The second flow hole 157 includes a large-diameter hole 157a and a small-diameter hole 157b penetrating the second flow body 156. The large-diameter hole 157a is, at the second flow body 156, formed so as to be opened at the front surface when the integral displacement body 130 slidably displaces against the elastic force of the return elastic body 132. The small-diameter hole 157b extends from the farthest portion of the large-diameter hole 157a to the rear surface, and is opened when the integral displacement body 130 slidably displaces against the elastic force of the return elastic body 132.

In this case, a flat-plate annular step portion 157c is formed between the large-diameter hole 157a and the small-diameter hole 157b. The small-diameter hole 157b is formed with a tapered portion 157d in a tapered shape, and at the tapered portion 157d, the hole diameter continuously decreases from an end portion on a large-diameter hole 157a side toward the far side of the small-diameter hole 157b. The small-diameter hole 157b is formed at such a position with such a size that the small-diameter hole 157b communicates with the large-diameter hole 157a and faces the first hole diameter restriction portion 155 without facing the first flow hole 154. That is, the small-diameter hole 157b is formed at such a position with such a size that, on the first hole diameter restriction portion 155, the small-diameter hole 157b does not overlap with the first flow hole 154. In the present embodiment, the small-diameter hole 157b is formed concentrically with the second flow body 156 and the large-diameter hole 157a, and is formed with a smaller diameter than that of the first flow hole 154.

The second hole diameter restriction portion 158 is a portion blocking the flow of the fluid 124 in the first flow hole 154. The second hole diameter restriction portion 158 is formed in a wall shape at the periphery of the small-diameter hole 157b forming the second flow hole 157. Specifically, the second hole diameter restriction portion 158 is formed at a position facing the first flow hole 154 so as to partially close the first flow hole 154 of the first flow body 153 when the second flow body 156 has contacted the first flow body 153. In the present embodiment, the second hole diameter restriction portion 158 is formed in a flat-plate annular shape with such a size that the second hole diameter restriction portion 158 closes about ⅓ of the first flow hole 154 of the first flow body 153 when the second flow body 156 has contacted the first flow body 153.

The separation elastic body 159 is a component producing an elastic force of separating the second flow body 156 from the first flow body 153 in the second flow body housing portion 151. The separation elastic body 159 includes a metal coil spring. One (the left side as viewed in the figure) end portion of the separation elastic body 159 presses the first hole diameter restriction portion 155 (the bottom portion of the second flow body housing portion 151), and the other (the right side as viewed in the figure) end portion is fitted onto an outer peripheral portion of the small-diameter portion 156b. The elastic force of the separation elastic body 159 is set to a level corresponding to the magnitude of external force for which the damper 120 needs to generate the maximum damping force. One first flow control valve 150 is provided at the valve support 141.

The second flow control valve 160 is a valve blocking the flow of the fluid 124 from the front side to the rear side in slide displacement when the integral displacement body 130 slidably displaces against the elastic force of the return elastic body 132 relative to the socket main body 107, and is also a valve allowing the fluid 124 to easily flow from the front side to the rear side in slide displacement when the integral displacement body 130 slidably displaces by the elastic force of the return elastic body 132. That is, the second flow control valve 160 includes a one-way valve. The configuration of the one-way valve as the second flow control valve 160 is well-known, and therefore, detailed description thereof will be omitted. One second flow control valve 160 is provided at a position of 180° from the first flow control valve 150 in the circumferential direction at the valve support 141.

The third flow control valve 170 is a valve causing the fluid 124 to flow with the limitation on the flow of the fluid 124 when the integral displacement body 130 slidably displaces against the elastic force of the return elastic body 132 relative to the socket main body 107 and when the integral displacement body 130 slidably displaces by the elastic force of the return elastic body 132. The third flow control valve 170 includes a thin through-hole formed at the valve support 141. In the present embodiment, the third flow control valves 170 are each formed at two intermediate positions between the first flow control valve 150 and the second flow control valve 160 in the circumferential direction at the valve support 141. Note that the third flow control valve 170 is equivalent to a flow restriction valve according to the present invention.

(Actuation of Steering Device 100)

Next, actuation of the steering device 100 configured as described above will be described. The steering device 100 is incorporated as the mechanism that steers the steered wheels (e.g., two front wheels) of the not-shown four-wheeled self-propelled vehicle right and left into the self-propelled vehicle. The steering device 100 changes the direction of each of two wheels 112 according to operation of the steering wheel 101 by the driver of the self-propelled vehicle, thereby determining the travelling direction of the self-propelled vehicle.

During travelling of such a self-propelled vehicle, each damper 120 in the steering device 100 is activated when the rack bar 103 has displaced to the vicinity of a right or left displacement limit with respect to the pinion gear 102a. In this case, the displacement limit of the rack bar 103 is a right or left steering limit of the wheel 112, and for example, includes not only a case where the driver of the self-propelled vehicle has turned the steering wheel 101 clockwise or counterclockwise to the vicinity of a turning limit, but also a case where great input acts on the rack bar 103 from a wheel 112 side due to collision of the wheel 112 with an obstacle such as a curbstone.

First, a case where the damper 120 is not activated will be described. As shown in FIG. 3, the integral displacement body 130 does not contact the rack housing 104 within an area where the rack bar 103 does not reach the vicinity of the displacement limit, such as a case where the wheel 112 of the self-propelled vehicle is not steered to the vicinity of the steering limit, and therefore, the damper 120 is not activated. In this case, in the damper 120, the flow control valve 140 is pressed against the wall forming body 122 in the inner chamber 121 through the buffer 123b by the elastic force of the return elastic body 132, as shown in FIG. 5. That is, the integral displacement body 130 is maintained in a state in which the integral displacement body 130 is elastically positioned at a position closest to the rack housing 104 side on the socket main body 107.

The first flow control valve 150 is maintained in a state in which the second flow body 156 is positioned at a position farthest from the first flow body 153 by the elastic force of the separation elastic body 159. That is, the first flow control valve 150 is in a state in which the flow of the fluid 124 is allowed.

Figure 6:
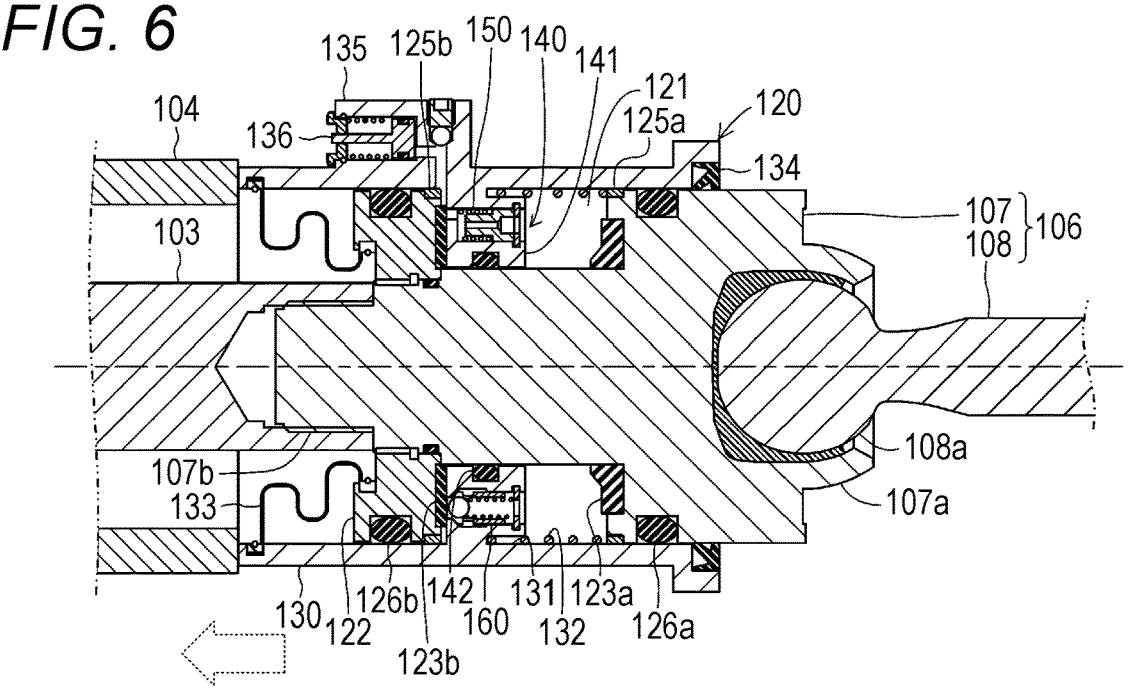
FIG. 6 is a sectional view showing the state of the damper shown in FIG. 3 at a moment when the integral displacement body has contacted a rack housing.

Next, a case where the damper 120 is activated will be described. As shown in FIG. 6, in a case where the rack bar 103 has reached the vicinity of the displacement limit (see a dashed arrow), such as a case where the wheel 112 of the self-propelled vehicle has been steered to the vicinity of the steering limit, the end portion of the integral displacement body 130 contacts the rack housing 104, and the damper 120 is activated. In this case, the case where the damper 120 is activated includes a case where the end portion of the integral displacement body 130 has contacted the rack housing 104 with weak force or strong force.

Figure 7:
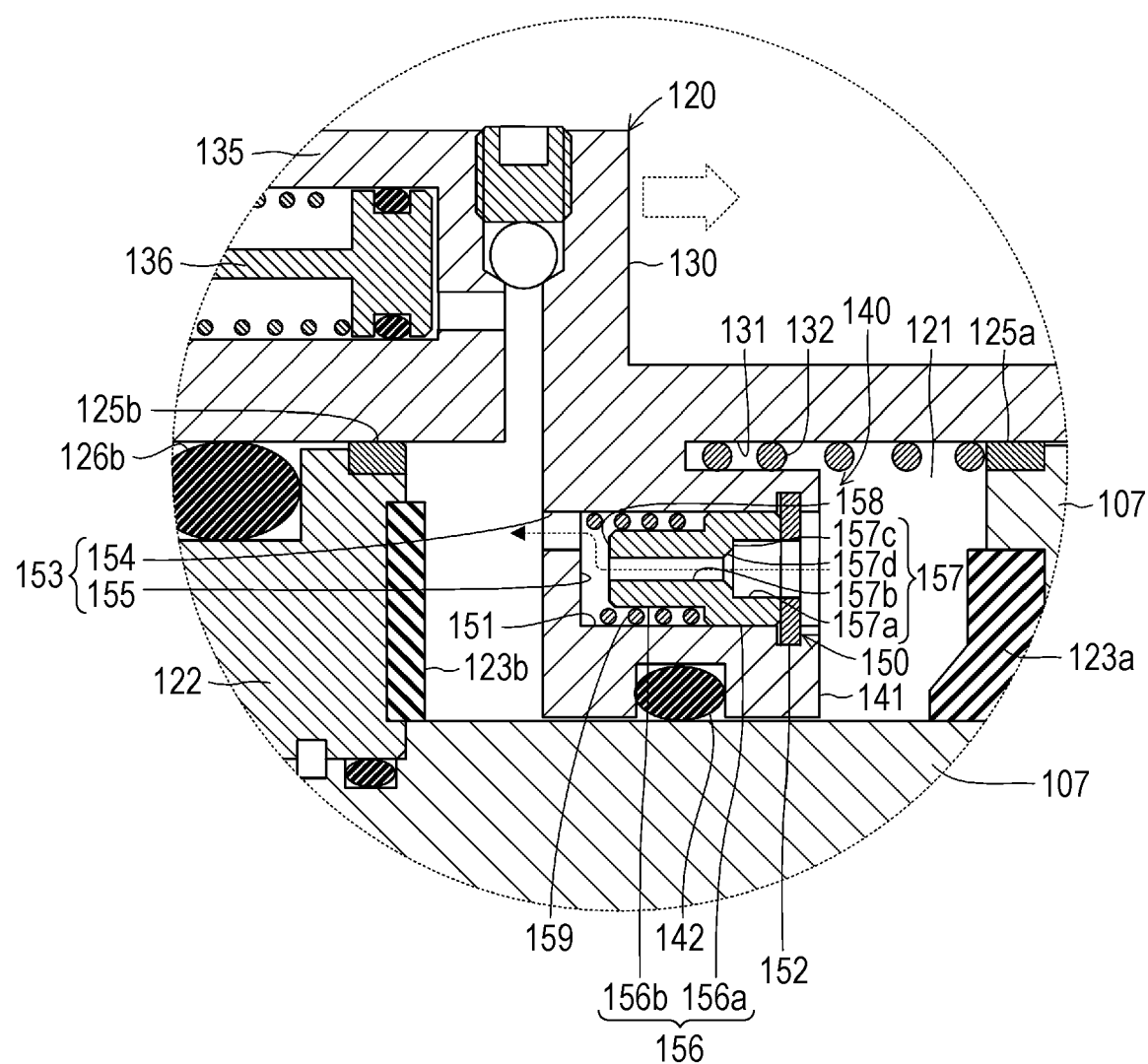
FIG. 7 is a partially-enlarged view showing the state of the damper shown in FIG. 5 when a first flow control valve causes fluid to flow.

First, in a case where the end portion of the integral displacement body 130 has contacted the rack housing 104 with weak force (low speed), the integral displacement body 130 slowly slidably displaces to the stud body 108 side relative to the socket main body 107, as shown in FIG. 7 (see a dashed arrow). That is, the flow control valve 140 displaces to the buffer 123a side against the elastic force of the return elastic body 132 in the inner chamber 121. In this case, in the first flow control valve 150, the fluid 124 flows in from the large-diameter hole 157a side of the second flow hole 157 of the second flow body 156, and flows toward a small-diameter hole 157b side.

However, in this case, since the flow control valve 140 slowly displaces in the inner chamber 121, a force of pressing the second flow body 156 is smaller than the elastic force of the separation elastic body 159. Thus, the second flow body 156 is not pressed against the first flow body 153 after having displaced to the first flow body 153 side. Consequently, in the first flow control valve 150, the fluid 124 on the front side in the displacement direction flows, with slight flow resistance, to the rear side in the displacement direction through each of the second flow hole 157 of the second flow body 156 and the first flow hole 154 of the first flow body 153 (see a dashed arrow).

Since the second flow control valve 160 is the one-way valve blocking the flow of the fluid 124 from the front side to the rear side in the displacement direction of the flow control valve 140 when the integral displacement body 130 slidably displaces against the elastic force of the return elastic body 132, the fluid 124 does not flow. Since the third flow control valve 170 is the valve allowing the fluid 124 to flow in both directions, i.e., the front side and the rear side, in the displacement direction of the flow control valve 140, the fluid 124 flows, with slight flow resistance, from the front side to the rear side in the displacement direction of the flow control valve 140.

Thus, the flow control valve 140 displaces to the buffer 123a side while generating ignorable extremely-small damping force. Accordingly, the integral displacement body 130 slowly slidably displaces to the stud body 108 side.

Thereafter, in a case where the rack bar 103 has displaced to a knuckle arm 111 side such that the end portion of the integral displacement body 130 is separated from the rack housing 104, the integral displacement body 130 displaces to an original position by the elastic force of the return elastic body 132 (see FIG. 5). In this case, in the first flow control valve 150, the fluid 124 flows in from the first flow body 153 side, and flows toward a second flow body 156 side.

In this case, the second flow body 156 is positioned at an original position farthest from the first flow body 153 by the elastic force of the separation elastic body 159 and the pressing force of the fluid 124 having flowed from the first flow body 153. Thus, in the first flow control valve 150, the fluid 124 on the front side in the displacement direction flows, with slight flow resistance, to the rear side in the displacement direction through each of the first flow hole 154 of the first flow body 153 and the second flow hole 157 of the second flow body 156.

Since the second flow control valve 160 is the one-way valve allowing the fluid 124 to flow from the front side to the rear side in the displacement direction of the flow control valve 140 when the integral displacement body 130 slidably displaces by the elastic force of the return elastic body 132, the fluid 124 flows with slight flow resistance. Since the third flow control valve 170 is the valve allowing the fluid 124 to flow in both directions, i.e., the front side and the rear side, in the displacement direction of the flow control valve 140, the fluid 124 flows, with slight flow resistance, from the front side to the rear side in the displacement direction of the flow control valve 140.

Thus, the flow control valve 140 displaces to the buffer 123b side while generating ignorable extremely-small damping force. Accordingly, the integral displacement body 130 slidably displaces to the rack housing 104 side faster than the above-described displacement speed.

Next, in a case where the end portion of the integral displacement body 130 has contacted the rack housing 104 with strong force (high speed) (e.g., abrupt steering by the driver or collision of the wheel 112 with, e.g., a curbstone), the integral displacement body 130 rapidly slidably displaces to the stud body 108 side relative to the socket main body 107. That is, the flow control valve 140 rapidly displaces to the buffer 123a side against the elastic force of the return elastic body 132 in the inner chamber 121.

Figure 8:
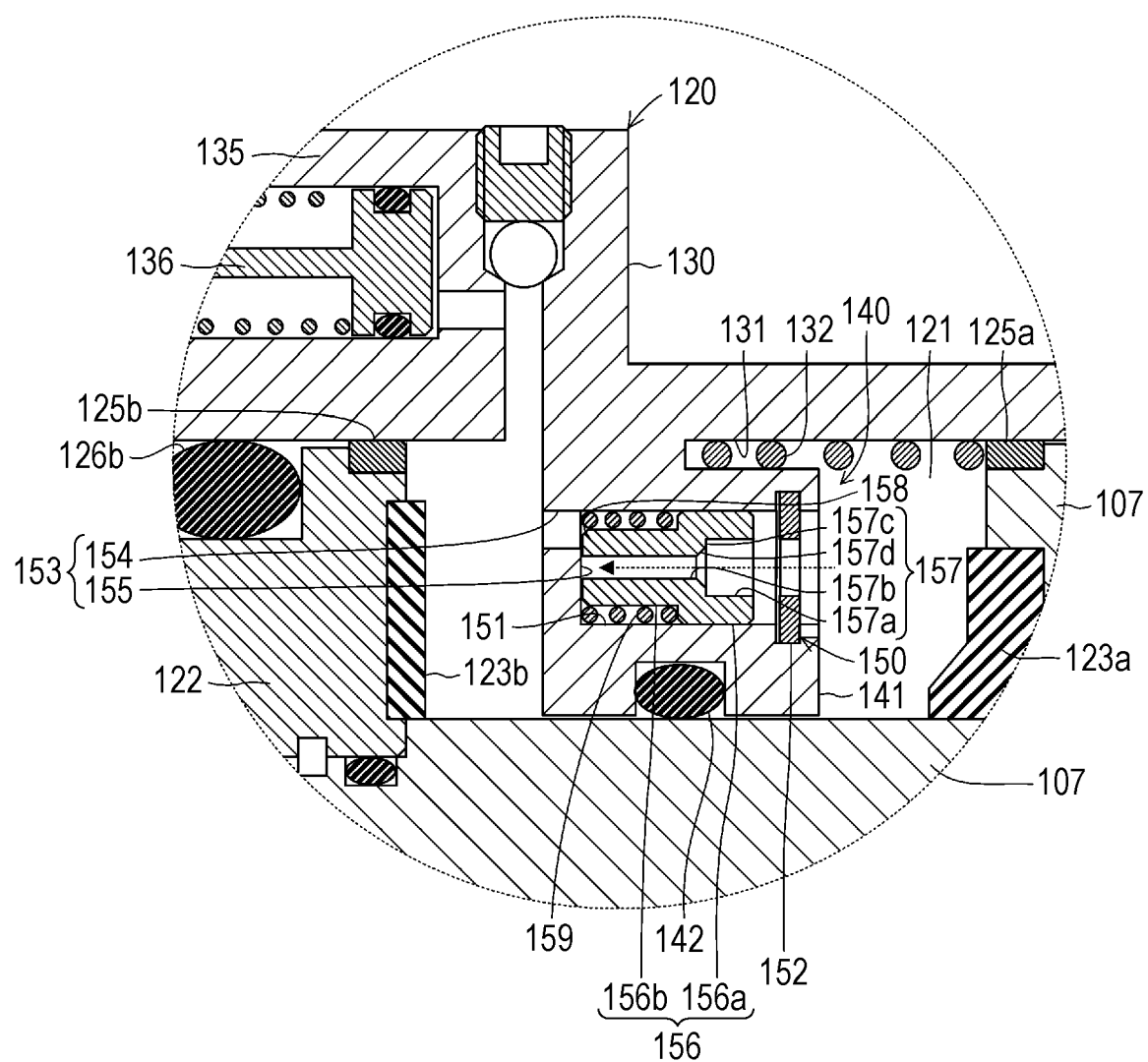
FIG. 8 is a partially-enlarged view showing the state of the damper shown in FIG. 5 when the first flow control valve does not cause the fluid to flow.

In this case, in the first flow control valve 150, a force of pressing the second flow body 156 by the fluid 124 is greater than the elastic force of the separation elastic body 159, and therefore, the second flow body 156 displaces to the first flow body 153 side and is pressed against the first flow body 153, as shown in FIG. 8. In this case, after the second flow body 156 has started displacing to the first flow body 153 side by action of the pressing force of the fluid 124 on the step portion 157c and the tapered portion 157d of the small-diameter hole 157b, the pressing force of the fluid 124 also acts on an end portion of the large-diameter hole 157a, and accordingly, the second flow body 156 displaces to the first flow body 153 side.

Moreover, in this case, since the first hole diameter restriction portion 155 and the second hole diameter restriction portion 158 are each formed at the positions facing the second flow hole 157 and the first flow hole 154, the first hole diameter restriction portion 155 and the second hole diameter restriction portion 158 close the entirety of the second flow hole 157 and part of the first flow hole 154. Thus, in the first flow control valve 150, the fluid 124 does not flow (see a dashed arrow) upon displacement of the flow control valve 140 to the stud body 108 side. Further, in this case, the fluid 124 does not flow in the second flow control valve 160 as in the above-described case.

Since the fluid 124 can flow only in the third flow control valve 170 in the flow control valve 140, extremely-great flow resistance is generated at the third flow control valve 170. Thus, the flow control valve 140 displaces to the buffer 123a side against the extremely-great flow resistance by the third flow control valve 170. Accordingly, the integral displacement body 130 slidably displaces to the stud body 108 side while generating extremely-great damping force. That is, the damper 120 can damp strong impact generated on the rack bar 103.

Thereafter, in a case where the rack bar 103 has displaced to the knuckle arm 111 side such that the end portion of the integral displacement body 130 is separated from the rack housing 104, the integral displacement body 130 displaces, as in the above-described case, to the original position by the elastic force of the return elastic body 132 (see FIG. 5). That is, the flow control valve 140 displaces to the buffer 123b side while generating ignorable extremely-small damping force, and therefore, the integral displacement body 130 quickly slidably displaces to the rack housing 104 side.

The second flow body 156 is separated from the first flow body 153 by the elastic force of the separation elastic body 159 and the pressing force of the fluid 124 having flowed from the first flow body 153, and returns to the original position. In this case, since the second hole diameter restriction portion 158 is formed at the position facing part of the first flow hole 154, the second flow body 156 can guide part of the fluid 124 having flowed into the second flow body housing portion 151 through the first flow hole 154 to a second flow hole 157 side. In the first flow control valve 150, the fluid 124 on the front side in the displacement direction flows, with slight flow resistance, to the rear side in the displacement direction through each of the first flow hole 154 of the first flow body 153 and the second flow hole 157 of the second flow body 156, as described above.

As can be understood from description of the actuation method above, according to the first embodiment, in the damper 120, the first flow body 153 and the second flow body 156 each having the first flow hole 154 and the second flow hole 157 causing the fluid 124 to flow are provided so as to elastically contact or separate from each other. Further, the first hole diameter restriction portion 155 is formed so as to close the entirety of the second flow hole 157. With this configuration, in the damper 120 according to the above-described embodiment, in a case where great external force acts on between the first flow body 153 and the second flow body 156, the first flow hole 154 and the second flow hole 157 are closed by the second hole diameter restriction portion 158 and the first hole diameter restriction portion 155, and the flow of the fluid 124 is limited accordingly. Thus, the steering device 100 can be configured to damp the great external force and absorb great impact force.

Second Embodiment

Next, a second embodiment of a steering device including flow control valves and dampers according to the present invention will be described with reference to FIGS. 9 to 13. A steering device 200 in the second embodiment is different from that of the first embodiment in that a damper 210 equivalent to the damper 120 in the first embodiment is not assembled with a socket main body 107, but with a rack housing 104. Thus, for the steering device 200 in the second embodiment, differences from the steering device 200 in the first embodiment will be mainly described, and description of common contents or corresponding contents between both embodiments will be omitted as necessary. In description of the second embodiment, the same reference numerals as those of the first embodiment will be used to represent components similar to those of the first embodiment.

(Configuration of Steering Device 200)

In the steering device 200, the cylindrical damper 210 is attached to a tip end portion of the rack housing 104 formed in a cylindrical shape. Further, a dust boot 201 is attached so as to cover the damper 210. The dust boot 201 is a component for preventing contamination of the damper 210. The dust boot 201 is formed in such a manner that an elastomer material such as a rubber material is formed in a cylindrical shape.

A rack bar 103 penetrating the rack housing 104 penetrates the cylindrical damper 210 attached to the tip end portion of the rack housing 104. A rack end 106 is attached to a tip end portion of the rack bar 103. In this case, an outer peripheral portion of the socket main body 107 attached to the rack bar 103 is formed so as to project in a flange shape from an outer peripheral portion of the rack bar 103, and is formed so as to face an end portion of an integral displacement body 230.

The damper 210 includes an inner chamber forming body 211. The inner chamber forming body 211 is a component forming an inner chamber 217, and is also a component for attaching the damper 210 to the rack housing 104. The damper 210 is formed in such a manner that a metal material is formed in a cylindrical shape. That is, the inner chamber forming body 211 corresponds to the socket main body 107 in the first embodiment. One (the left side as viewed in the figure) end portion of an outer peripheral portion of the inner chamber forming body 211 is formed with an external thread portion 211a to be screwed into the rack housing 104, and the other (the right side as viewed in the figure) end portion is formed with each of an oil supply port 212 and an accumulator housing portion 213.

The oil supply port 212 is a flow path for injecting fluid 124 into the inner chamber 217 or discharging the fluid 124 from the inner chamber 217. The oil supply port 212 is openably closed with a plug. The accumulator housing portion 213 and an accumulator 214 each correspond to the accumulator housing portion 135 and the accumulator 136 in the first embodiment. Wall forming bodies 215, 216 are each screwed into both end portions of the inner chamber forming body 211. The cylindrical inner chamber 217 is formed between these two wall forming bodies 215, 216.

The wall forming bodies 215, 216 are components for forming both the right and left wall portions of the inner chamber 217 as viewed in the figure. The wall forming body 215, 216 is formed in such a manner that a metal material is formed in a circular ring shape. That is, the wall forming body 215, 216 corresponds to the wall forming body 122 in the first embodiment. Thus, the inner chamber 217 is formed in a circular-ring tubular shape extending in an axis direction among the wall forming bodies 215, 216 and the later-described integral displacement body 230 inside the inner chamber forming body 211. A return elastic body 218 is fitted onto an outer peripheral portion of the intermediate-coupling-body-105-side wall forming body 216 of these wall forming bodies 215, 216.

The return elastic body 218 is a component for elastically pressing a flow control valve 240 to the right end portion in the inner chamber 217 as viewed in the figure. The return elastic body 218 includes a metal coil spring. That is, the return elastic body 218 corresponds to the return elastic body 132 in the first embodiment. One (the left side as viewed in the figure) end portion of the return elastic body 218 elastically presses the wall forming body 216, and the other (the right side as viewed in the figure) end portion elastically presses the integral displacement body 230 through a backing plate 218a.

The wall forming body 215, 216 is provided with a buffer 221a, 221b, a sliding bush 222a, 222b, a seal ring 223a, 223b, and a dust seal 224a, 224b each corresponding to the buffer 123a, 123b, the sliding bush 125a, 125b, the seal ring 126a, 126b, and the dust seal 134 in the first embodiment.

The integral displacement body 230 is a component covering the inside of the inner chamber 217 in a radial direction and formed with the flow control valve 240. The integral displacement body 230 is formed in such a manner that a metal material is formed in a cylindrical shape. That is, the integral displacement body 230 corresponds to the integral displacement body 130 in the first embodiment. The integral displacement body 230 is formed in such a cylindrical shape that the integral displacement body 230 is slidably fitted in inner peripheral surfaces of the wall forming bodies 215, 216 through the sliding bushes 222a, 222b. In this case, the integral displacement body 230 is formed with such a length that the integral displacement body 230 projects from each end portion of the wall forming bodies 215, 216. The inner diameter of the integral displacement body 230 is formed with such a size that the rack bar 103 penetrates therethrough.

The backing plate 218a is attached in a fixed manner to one (the right side as viewed in the figure) end portion of an outer peripheral portion of the integral displacement body 230, and each of a fixing sleeve 231 and the flow control valve 240 is attached to a portion from the other (the left side as viewed in the figure) end portion to a center portion in the axial direction. The fixing sleeve 231 is a component for pressing the flow control valve 240 fitted onto a small-diameter portion of the outer peripheral portion of the integral displacement body 230 against a large-diameter portion of the outer peripheral portion of the integral displacement body 230 and fixing the flow control valve 240 to the large-diameter portion. The fixing sleeve 231 is formed in such a manner that a metal material is formed in a cylindrical shape. The fixing sleeve 231 is assembled integrally with the integral displacement body 230 with fitted onto the outer peripheral portion of the integral displacement body 230. The fixing sleeve 231 slides relative to the wall forming body 215 through the sliding bush 222a.

The flow control valve 240 is a tool causing the fluid 124 to flow with a limitation on the flow of the fluid 124 in the inner chamber 217 to control the flow of the fluid 124, thereby generating damping force of the damper 210. The flow control valve 240 corresponds to the flow control valve 140 in the first embodiment. The flow control valve 240 mainly includes each of a valve support 241, a first flow control valve 150, a second flow control valve 160, and third flow control valves 170.

The valve support 241 is a component formed with each of the first flow control valve 150, the second flow control valve 160, and the third flow control valves 170. The valve support 241 is formed in such a manner that a metal material is formed in a flat-plate circular ring shape. That is, the valve support 241 is formed separately from the integral displacement body 230, and is integrally attached to the integral displacement body 230 through the fixing sleeve 231. A seal ring 242 corresponding to the seal ring 142 in the first embodiment is fitted onto an outer peripheral portion of the valve support 241.

The first flow control valve 150, the second flow control valve 160, and the third flow control valve 170 are configured similar to those of the above-described embodiment, and therefore, description thereof will be omitted. The flow control valve 240 is attached to the outer peripheral portion of the integral displacement body 230 in such an orientation that a large-diameter portion 156a of a second flow body 156 of the first flow control valve 150 is opened on a buffer 221a side (the left side as viewed in the figure).

(Actuation of Steering Device 200)

Next, actuation of the steering device 200 configured as described above will be described. As in the steering device 100 of the above-described embodiment, in the steering device 200, each damper 210 is activated when the rack bar 103 has displaced to the vicinity of a right or left displacement limit with respect to a pinion gear 102a.

Figure 9:
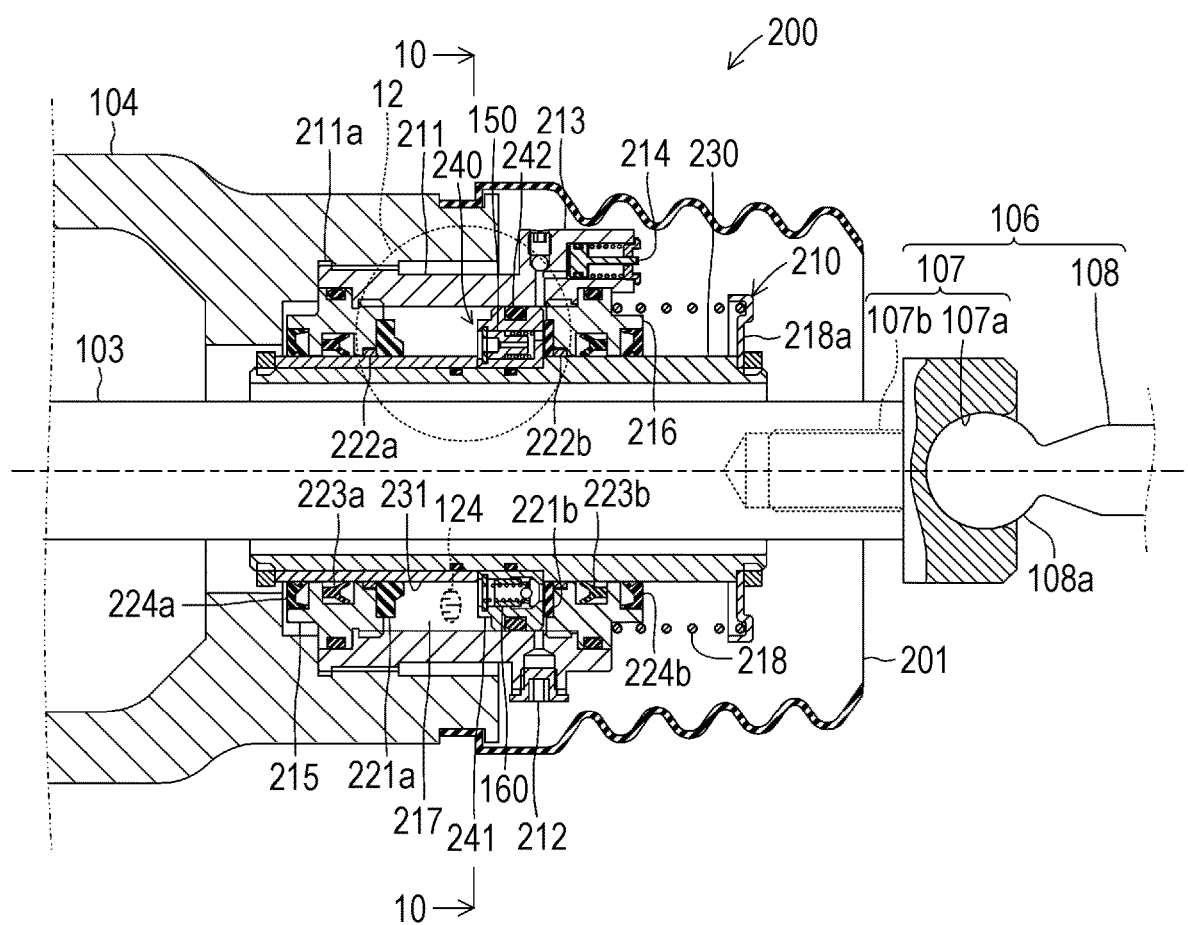
FIG. 9 is a sectional view showing the outline of an internal configuration of a damper according to a second embodiment of the present invention.
Figure 10:
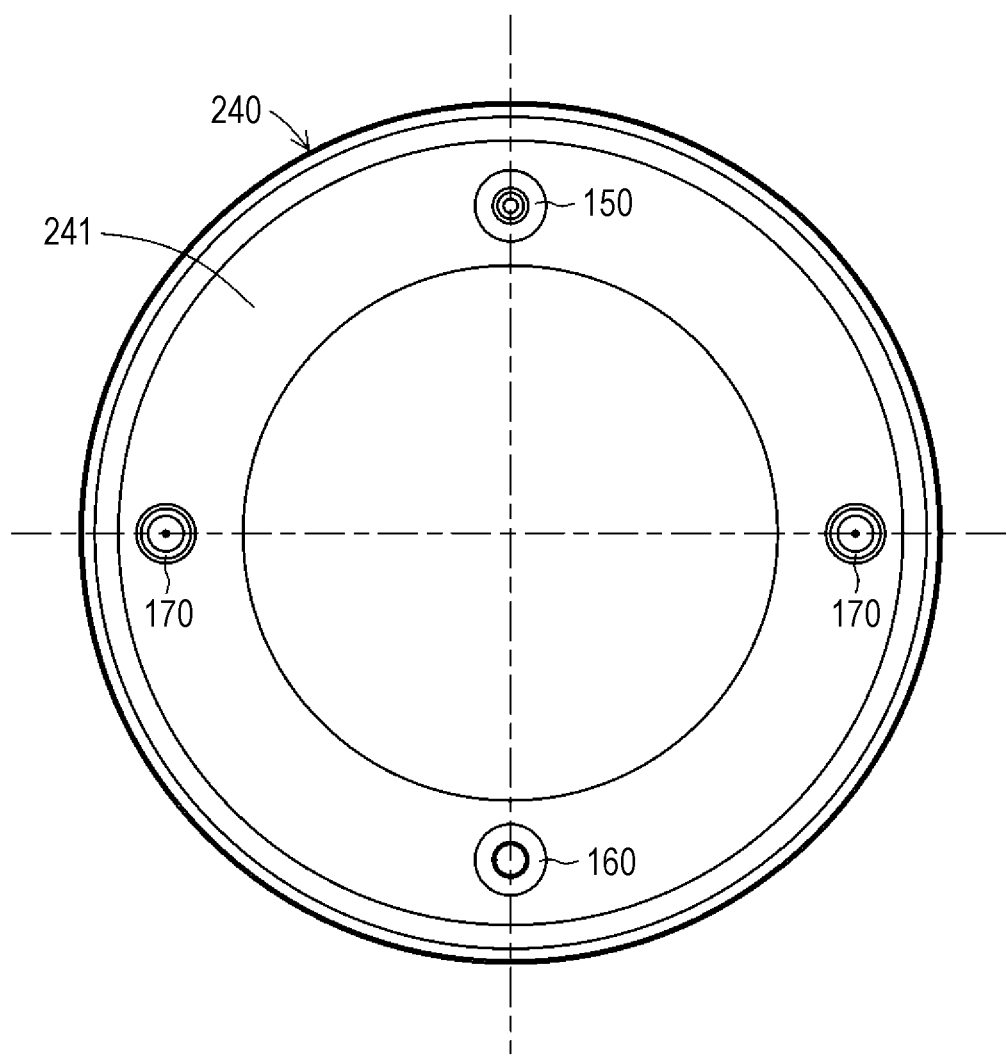
FIG. 10 is a front view of only a flow control valve along a 10-10 line shown in FIG. 9.

Specifically, the socket main body 107 does not contact the integral displacement body 230 within an area where the rack bar 103 does not reach the vicinity of the displacement limit, such as a case where a wheel 112 of a self-propelled vehicle is not steered to the vicinity of a steering limit, and therefore, the damper 210 is not activated (see FIG. 9). In this case, in the damper 210, the flow control valve 240 is pressed against the wall forming body 216 through the buffer 221b by elastic force of the return elastic body 218 in the inner chamber 217. That is, the integral displacement body 230 is maintained in a state in which the integral displacement body 230 is elastically positioned at a position closest to a socket main body 107 side in the inner chamber 217.

Further, the first flow control valve 150 is maintained in a state in which the second flow body 156 is positioned at a position farthest from the first flow body 153 by the elastic force of the separation elastic body 159. That is, the first flow control valve 150 is in a state in which the flow of the fluid 124 is allowed.

Figure 11:
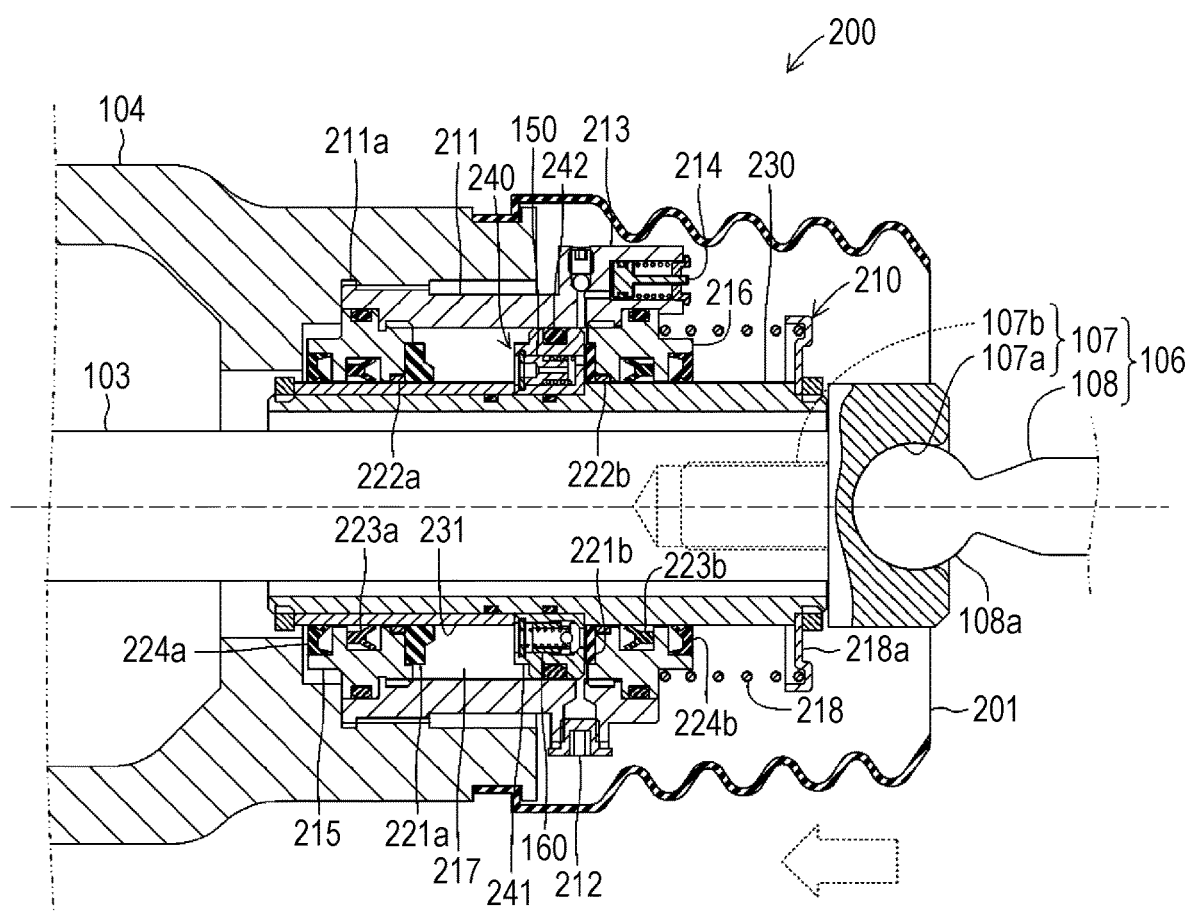
FIG. 11 is a sectional view showing the state of the damper shown in FIG. 9 at a moment when a socket main body has contacted an integral displacement body.

Next, as shown in FIG. 11, in a case where the rack bar 103 has reached the vicinity of the displacement limit, such as a case where the wheel 112 of the self-propelled vehicle has been steered to the vicinity of the steering limit, the socket main body 107 contacts the end portion of the integral displacement body 130, and the damper 120 is activated.

Figure 12:
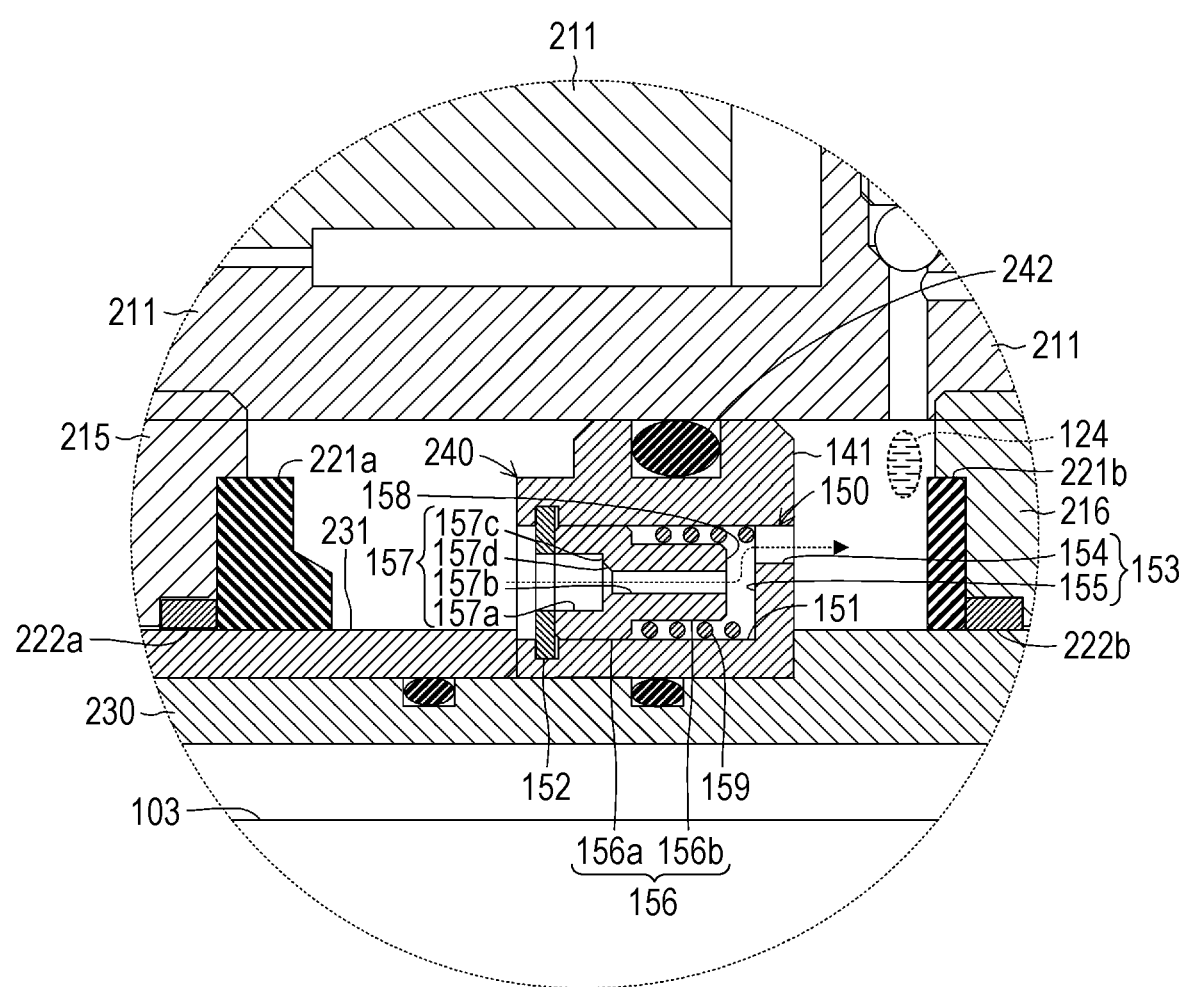
FIG. 12 is a partially-enlarged view of a portion, which is indicated by a dashed circle 12, of the damper shown in FIG. 9 in a state in which a first flow control valve causes fluid to flow.

First, in a case where the socket main body 107 has contacted the end portion of the integral displacement body 230 with weak force (low speed), the integral displacement body 230 slowly slidably displaces to a rack housing 104 side relative to the inner chamber forming body 211, as shown in FIG. 12. That is, the flow control valve 240 displaces to the buffer 221a side (the left side as viewed in the figure) against the elastic force of the return elastic body 218 in the inner chamber 217. In this case, in the first flow control valve 150, the fluid 124 flows in from a large-diameter hole 157a side of a second flow hole 157 of the second flow body 156, and flows toward a small-diameter hole 157b side.

However, in this case, since the flow control valve 240 slowly displaces in the inner chamber 217, a force of pressing the second flow body 156 is smaller than elastic force of a separation elastic body 159. Thus, the second flow body 156 is not pressed against the first flow body 153 after having displaced to a first flow body 153 side. Consequently, in the first flow control valve 150, the fluid 124 on the front side in the displacement direction flows, with slight flow resistance, to the rear side in the displacement direction through each of the second flow hole 157 of the second flow body 156 and a first flow hole 154 of the first flow body 153.

Since the second flow control valve 160 is a one-way valve blocking the flow of the fluid 124 from the front side to the rear side in the displacement direction of the flow control valve 240 when the integral displacement body 230 slidably displaces against the elastic force of the return elastic body 218, the fluid 124 does not flow. Since the third flow control valve 170 is a valve allowing the fluid 124 to flow in both directions, i.e., the front side and the rear side, in the displacement direction of the flow control valve 240, the fluid 124 flows, with slight flow resistance, from the front side to the rear side in the displacement direction of the flow control valve 240.

Thus, the flow control valve 240 displaces to the buffer 221a side while generating ignorable extremely-small damping force. Accordingly, the integral displacement body 230 slowly slidably displaces to the rack housing 104 side.

Thereafter, in a case where the rack bar 103 has displaced to a knuckle arm 111 side such that the socket main body 107 is separated from the end portion of the integral displacement body 230, the integral displacement body 230 displaces to an original position by the elastic force of the return elastic body 218 (see FIG. 9), as in the first embodiment. That is, the flow control valve 240 displaces to a buffer 221b side while generating ignorable extremely-small damping force. Accordingly, the integral displacement body 230 slidably displaces to the socket main body 107 side faster than the above-described displacement speed.

Figure 13:
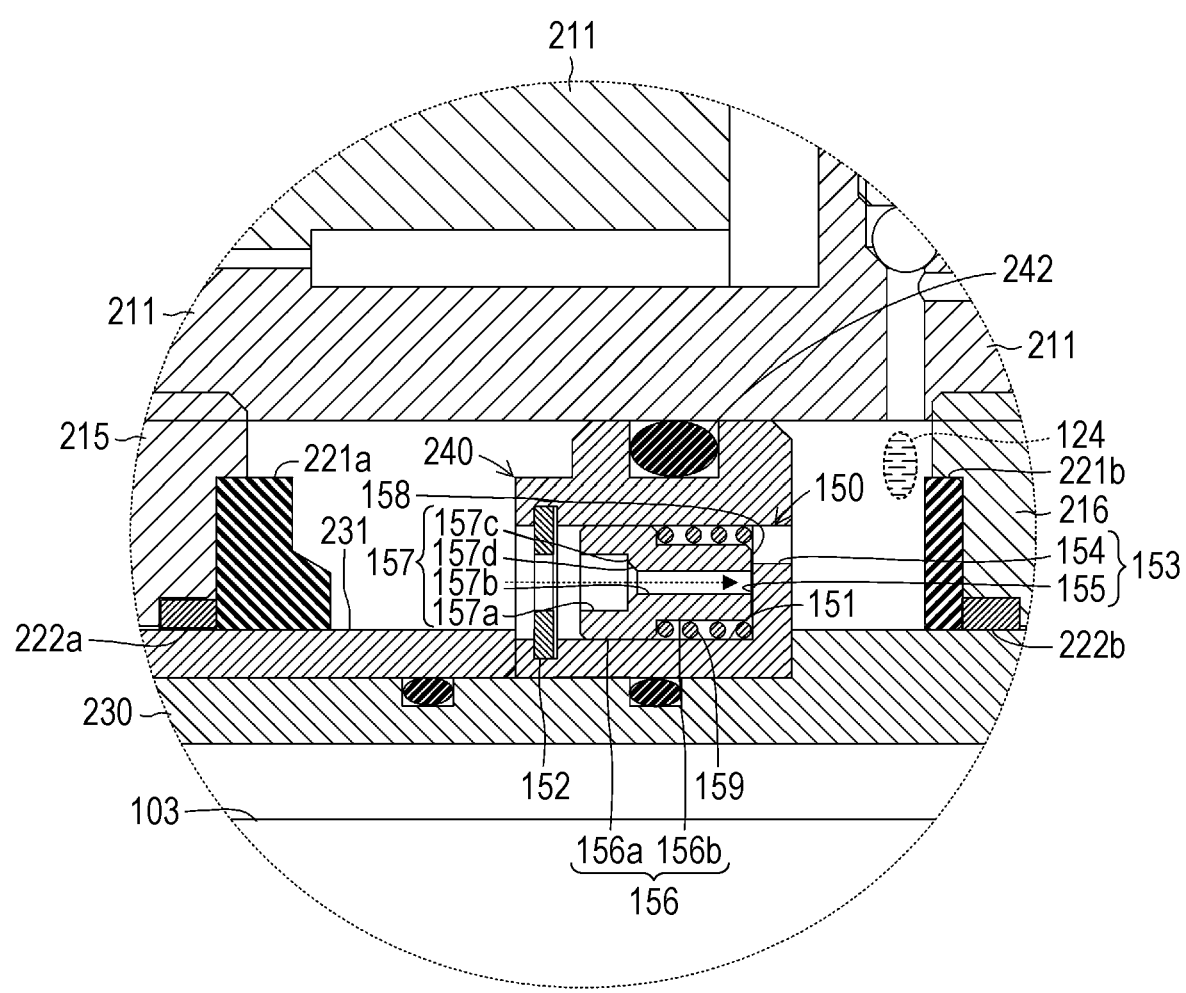
FIG. 13 is a partially-enlarged view showing the state of the damper shown in FIG. 9 when the first flow control valve does not cause the fluid to flow.

Next, in a case where the socket main body 107 has contacted the end portion of the integral displacement body 230 with strong force (high speed), the integral displacement body 230 rapidly slidably displaces to the rack housing 104 side relative to the inner chamber forming body 211, as shown in FIG. 13. That is, the flow control valve 240 rapidly displaces to the buffer 221a side against the elastic force of the return elastic body 218 in the inner chamber 217.

In this case, in the first flow control valve 150, a force of pressing the second flow body 156 by the fluid 124 is greater than the elastic force of the separation elastic body 159, and therefore, the second flow body 156 displaces to the first flow body 153 side and is pressed against the first flow body 153. In this case, since a first hole diameter restriction portion 155 and a second hole diameter restriction portion 158 are each formed at positions facing the second flow hole 157 and the first flow hole 154, the first hole diameter restriction portion 155 and the second hole diameter restriction portion 158 close the entirety of the second flow hole 157 and part of the first flow hole 154. Thus, in the first flow control valve 150, the fluid 124 does not flow (see a dashed arrow) upon displacement of the flow control valve 240 to the rack housing 104 side. Further, in this case, the fluid 124 does not flow in the second flow control valve 160 as in the above-described case.

Since the fluid 124 can flow only in the third flow control valve 170 in the flow control valve 240, extremely-great flow resistance is generated at the third flow control valve 170. Thus, the flow control valve 240 displaces to the buffer 221a side against the extremely-great flow resistance by the third flow control valve 170. Accordingly, the integral displacement body 230 slidably displaces to the rack housing 104 side while generating extremely-great damping force. That is, the damper 210 can damp strong impact generated on the rack bar 103.

Thereafter, in a case where the rack bar 103 has displaced to the knuckle arm 111 side such that the socket main body 107 is separated from the end portion of the integral displacement body 230, the integral displacement body 230 displaces, as in the above-described case, to the original position by the elastic force of the return elastic body 218 (see FIG. 9). That is, the flow control valve 240 displaces to the buffer 221b side while generating ignorable extremely-small damping force, and therefore, the integral displacement body 230 quickly slidably displaces to the socket main body 107 side.

Implementation of the present invention is not limited to each of the above-described embodiments, and various changes can be made without departing from the object of the present invention. Note that in description of each variation, the same reference numerals are used to represent elements similar to those of the above-described embodiments and overlapping description thereof will be omitted.

For example, in each of the above-described embodiments, the first flow control valve 150 is configured such that the second hole diameter restriction portion 158 of the second flow body 156 closes part of the first flow hole 154 of the first flow body 153 and the first hole diameter restriction portion 155 of the first flow body 153 closes the entirety of the second flow hole 157 of the second flow body 156. However, the first flow control valve 150 may only be required to be configured such that at least part of at least one of the first flow hole 154 or the second flow hole 157 is closed.

Figure 14:
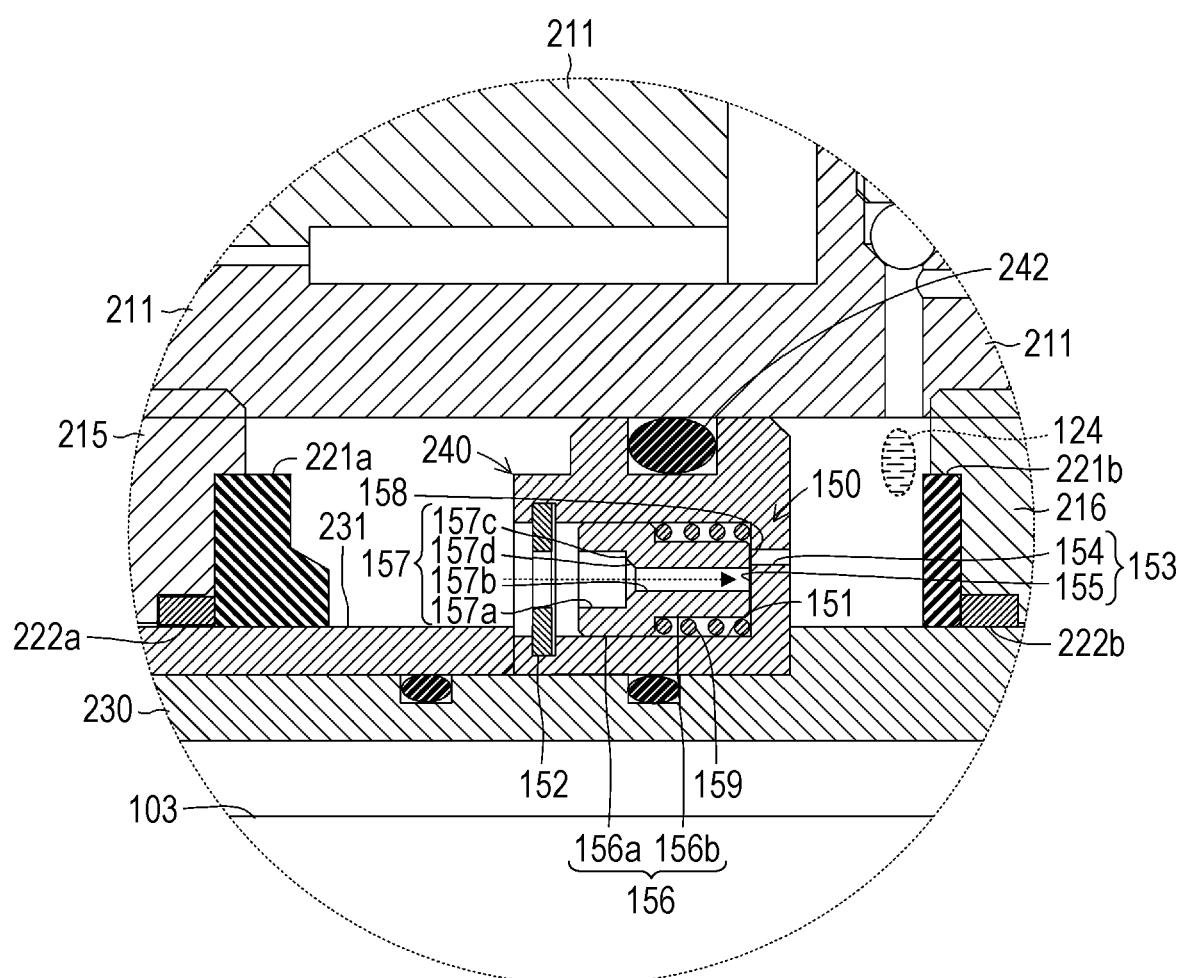
FIG. 14 is a partially-enlarged view showing the state of a damper according to a variation of the present invention when both a first flow hole and a second flow hole are fully closed such that a first flow control valve does not cause fluid to flow.
Figure 15:
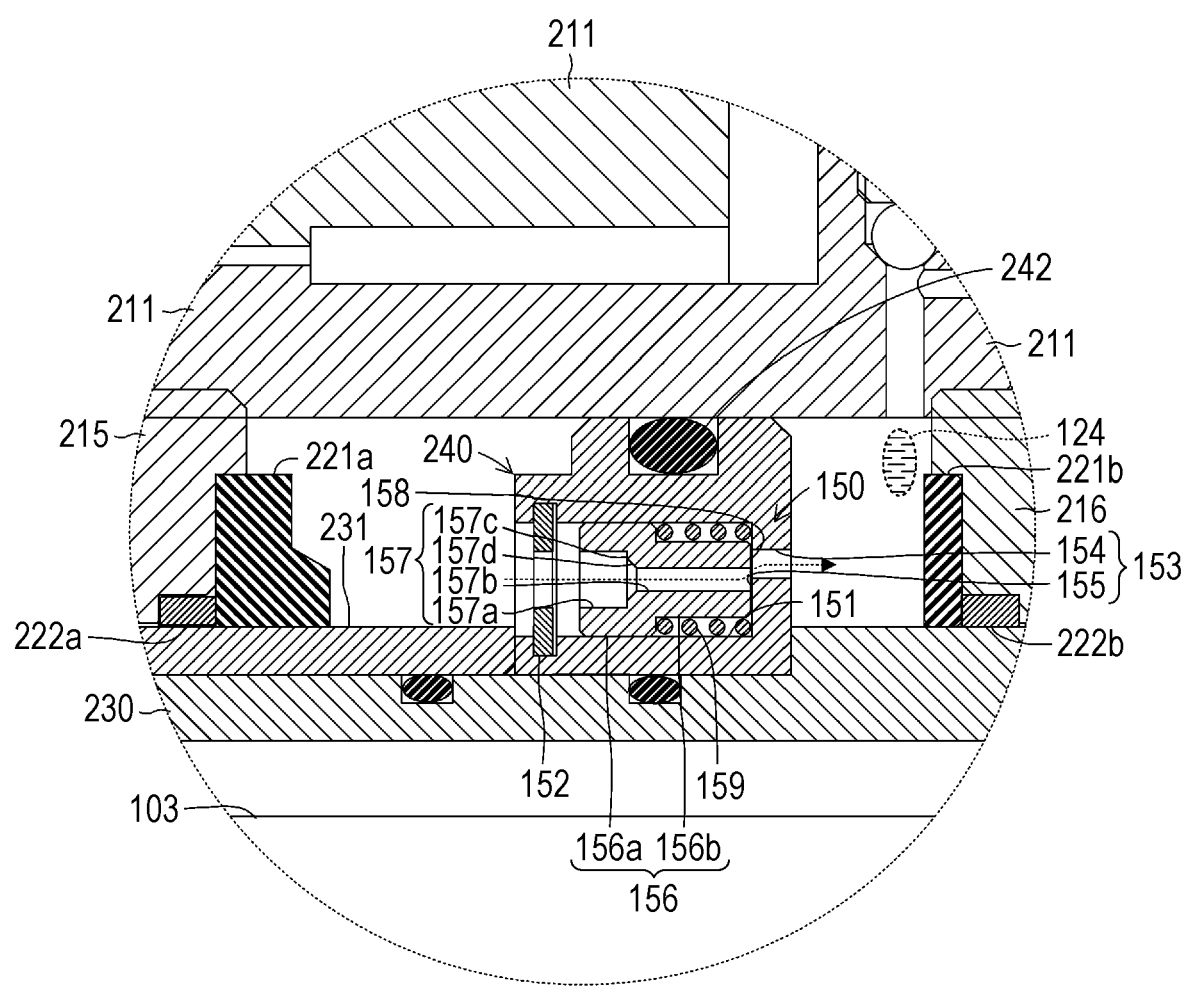
FIG. 15 is a partially-enlarged view showing the state of a damper according to another variation of the present invention when part of a first flow hole and part of a second flow hole overlap with each other such that the flow of fluid is ensured.

Thus, the first flow control valve 150 may be, for example, configured such that both the first flow hole 154 and the second flow hole 157 are fully closed, as shown in FIG. 14. Alternatively, the first flow control valve 150 may be configured such that part of each of the first flow hole 154 and the second flow hole 157 is closed. In this case, the first flow control valve 150 may be, for example, configured such that part of the first flow hole 154 and part of the second flow hole 157 overlap with each other to ensure the flow of the fluid 124 when the second flow body 156 closely contacts the first flow body 153, as shown in FIG. 15. According to this configuration, the flow control valve 140, 240 may be formed without the third flow control valve 170.

Figure 16:
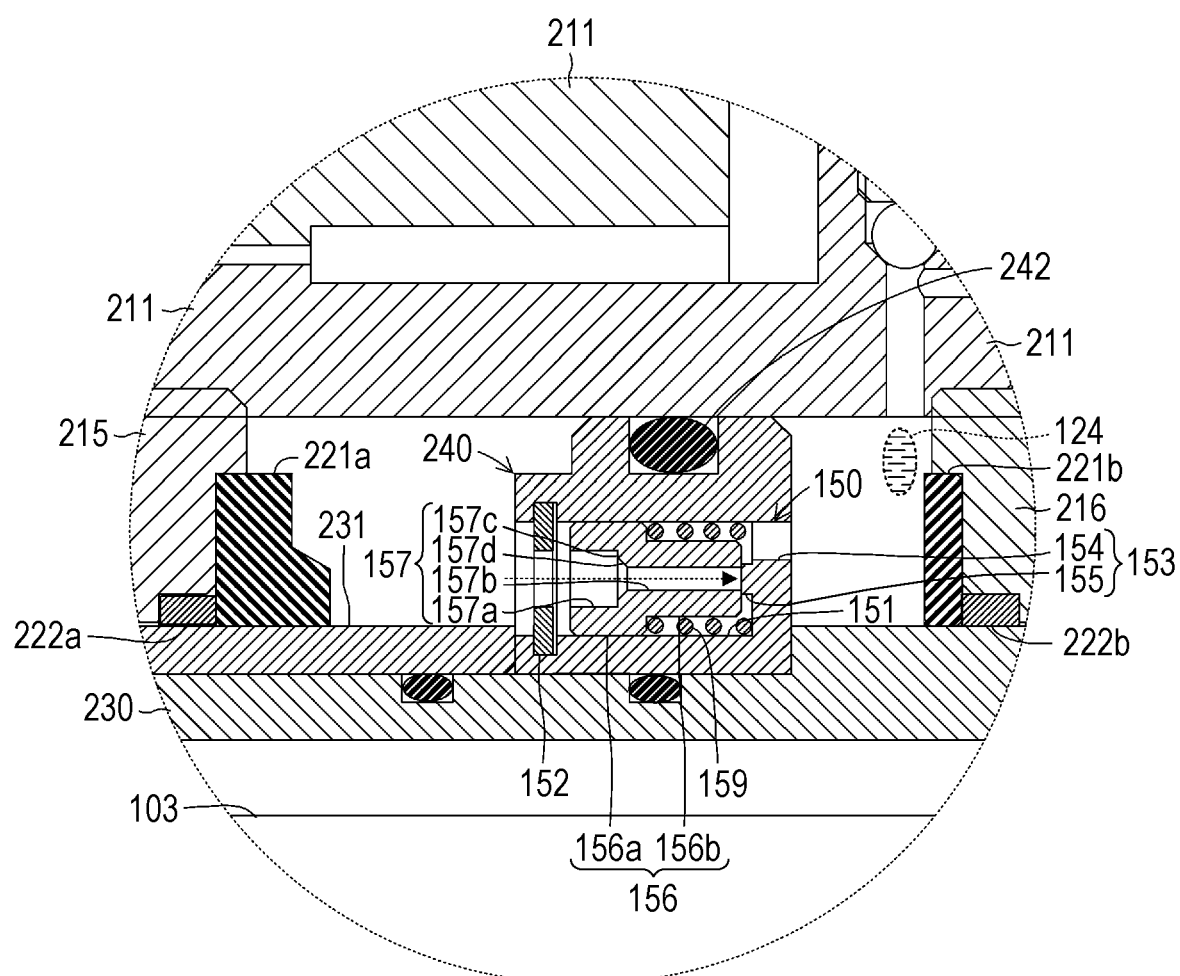
FIG. 16 is a partially-enlarged view showing the state of a damper of still another variation of the present invention when only a second flow hole is fully closed such that a first flow control valve does not cause fluid to flow.

The first flow control valve 150 may be configured such that one of the first flow hole 154 or the second flow hole 157 is fully closed and the other one of the first flow hole 154 or the second flow hole 157 is not closed at all. For example, as shown in FIG. 16, in the first flow control valve 150, the first hole diameter restriction portion 155 protruding in a columnar shape to the small-diameter hole 157b (the second flow hole 157) side may be formed at a portion of the bottom portion of the second flow body housing portion 151 facing the small-diameter hole 157b. In this case, the second hole diameter restriction portion 158 of the second flow body 156 is omitted. According to this configuration, in the first flow control valve 150, only the second flow hole 157 can be closed by contact of the second flow body 156 with the first hole diameter restriction portion 155.

Figure 17:
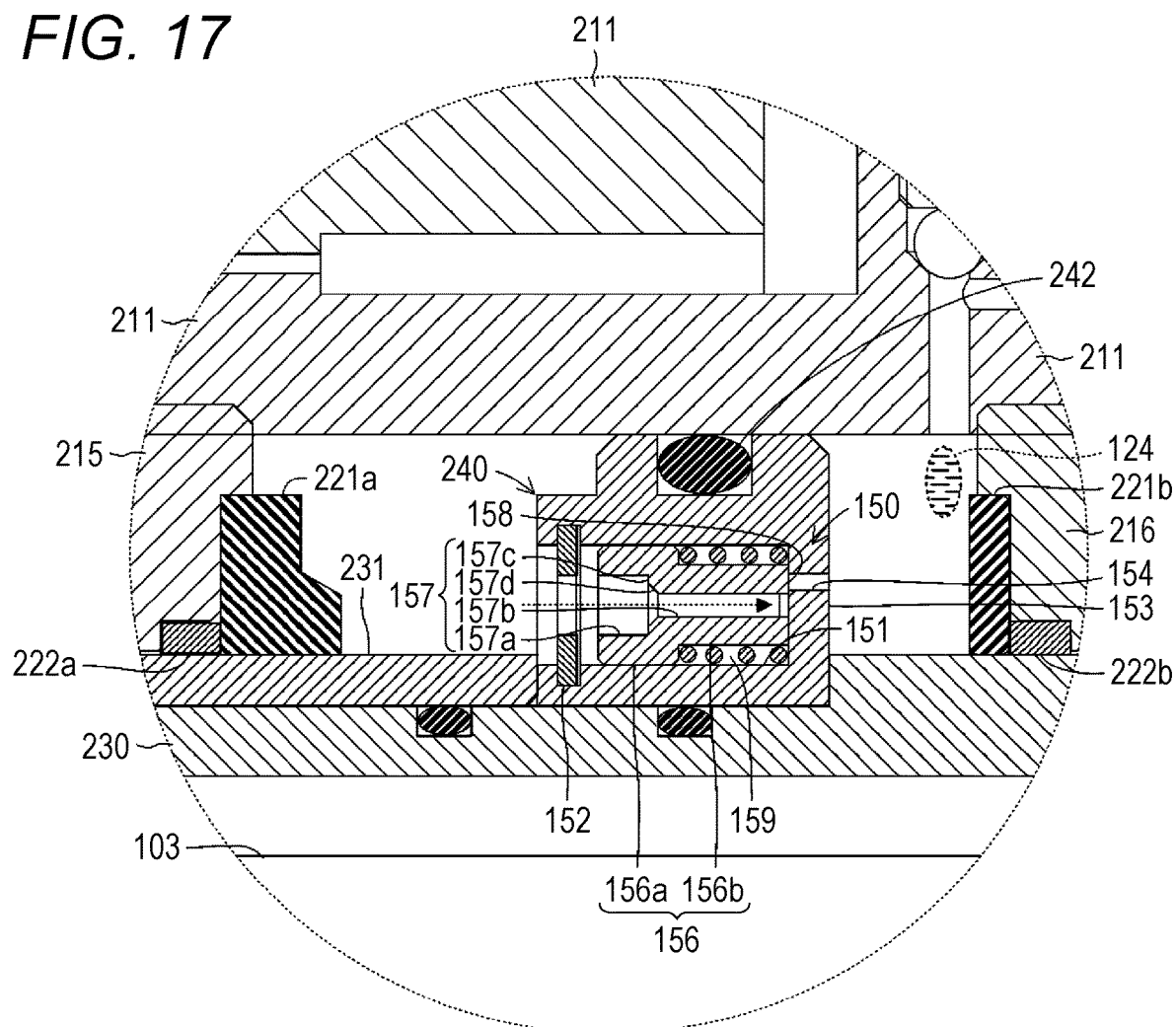
FIG. 17 is a partially-enlarged view showing the state of a damper according to still another variation of the present invention when only a first flow hole is fully closed such that a first flow control valve does not cause fluid to flow.
Figure 18:
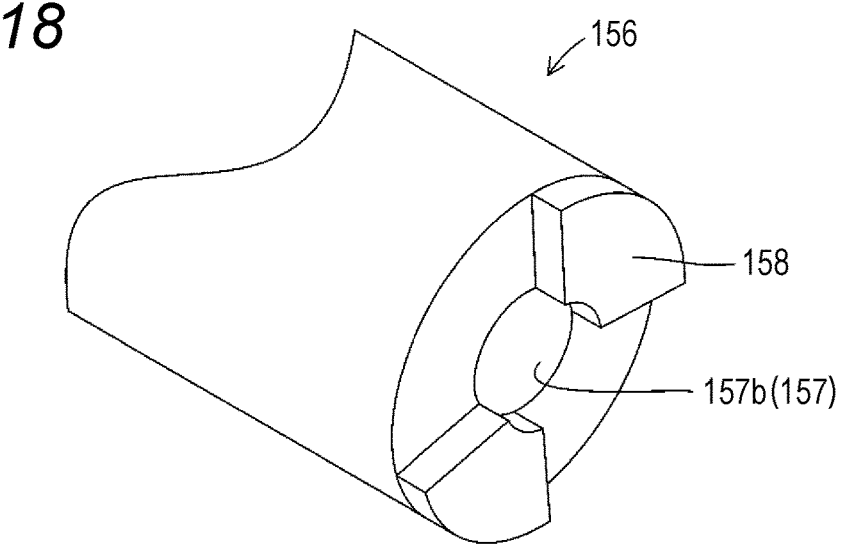
FIG. 18 is a partially-enlarged perspective view showing an external configuration of a tip end portion of a second flow body shown in FIG. 17.

For example, as shown in each of FIGS. 17 and 18, in the first flow control valve 150, the second hole diameter restriction portion 158 protruding in a columnar shape toward a first flow hole 154 side is provided at a portion of the second flow body 156 facing the first flow hole 154 so that only the first flow hole 154 can be closed. In this case, the first hole diameter restriction portion 155 of the first flow body 153 is omitted. In these cases, the columnar first hole diameter restriction portion 155 and/or the columnar second hole diameter restriction portion 158 may be inserted into the small-diameter hole 157b (the second flow hole 157) and/or the first flow hole 154 to close each hole.

In each of the above-described embodiments, the second flow hole 157 includes two holes, i.e., the large-diameter hole 157a and the small-diameter hole 157b. However, the second flow hole 157 may include one of the large-diameter hole 157a or the small-diameter hole 157b, or may include three or more holes having different inner diameters. At the second flow hole 157, the tapered portion 157d is formed at an opening of the small-diameter hole 157b on the side opposite to the first flow body 153. With this configuration, in the second flow body 156, the fluid 124 can easily flow into the second flow hole 157, and activation of the first flow control valve 150 can be easily stabilized. In the first flow control valve 150, the fluid 124 easily flows into the second flow hole 157 so that a flow speed can be increased. Thus, the tapered portion 157d receives strong pressing force from the fluid 124, and accordingly, the second flow body 156 can easily displace to the first flow body 153 side. However, the second flow hole 157 is not necessarily formed in the tapered shape, but may be formed in a straight shape, needless to say. Note that the first flow hole 154 may include multiple different holes or have a tapered shape at an opening.

In each of the above-described embodiments, the flow control valve 140, 240 includes each of the second flow control valve 160 and the third flow control valves 170 in addition to the first flow control valve 150. The second flow control valve 160 described herein can improve the displacement speed of the flow control valve 140, 240 upon return displacement. The third flow control valve 170 can ensure the flow of the fluid 124 in a state in which the second flow body 156 closely contacts the first flow body 153 and the flow of the fluid 124 is fully blocked. However, the flow control valve 140, 240 may be formed without at least one of the second flow control valve 160 or the third flow control valve 170.

In each of the above-described embodiments, the damper 120, 210 is configured such that the first flow control valve 150 is provided in the inner chamber 121, 217. However, the damper 120, 210 may be configured such that the first flow control valve 150 is provided outside the inner chamber 121, 217. Note that the damper 120, 210 may be configured such that the second flow control valve 160 and the third flow control valves 170 are also provided outside the inner chamber 121, 217.

In each of the above-described embodiments, the damper 120, 210 includes the return elastic body 132, 218. However, the damper 120, 210 may be formed without the return elastic body 132, 218 in a case where the flow control valve 140, 240 does not need to be constantly pressed to one side in the inner chamber 121, 217.

In the first embodiment, the socket main body 107 equivalent to the inner chamber forming body according to the present invention includes the solid bar body. However, the socket main body 107 can be formed according to a target to which the damper 120 is to be attached, and therefore, may be formed in a tubular shape, for example.

In the second embodiment, the integral displacement body 230 is formed in the tubular shape. However, the integral displacement body 230 can be formed according to a target to which the damper 210 is to be attached, and therefore, may be formed in a solid bar shape, for example.

In each of the above-described embodiments, the damper 120, 210 is applied to the steering device 100, 200. However, the damper 120, 210 may be, upon use thereof, attached to a device or a tool other than the steering device 100, 200, such as a suspension mechanism, a seat tilting mechanism, a door opening/closing mechanism, a mechanical device other than the self-propelled vehicle, an electrical device, a tool, or furniture.

LIST OF REFERENCE SIGNS

100 Steering Device
101 Steering Wheel
102 Steering Shaft
102a Pinion Gear
103 Rack Bar
103a Rack Gear
104 Rack Housing
105 Intermediate Coupling Body
106 Rack End
107 Socket Main Body (Inner Chamber Forming Body)
107a Ball Holding Portion
107b External Thread Portion
108 Stud Body
108a Ball Portion
110 Tie Rod
111 Knuckle Arm
112 Wheel
120 Damper
121 Inner Chamber
122 Wall Forming Body
123a, 123b Buffer
124 Fluid
125a, 125b Sliding Bush 126a, 126b Seal Ring
130 Integral Displacement Body
131 Elastic Body Holding Portion
132 Return Elastic Body
133 Dust Boot
134 Dust Seal
135 Accumulator Housing Portion
136 Accumulator
140 Flow Control Valve
141 Valve Support
142 Seal Ring
150 First Flow Control Valve
151 Second Flow Body Housing Portion
152 Retaining Ring
153 First Flow Body
154 First Flow Hole
155 First Hole Diameter Restriction Portion
156 Second Flow Body
156a Large-Diameter Portion
156b Small-Diameter Portion
157 Second Flow Hole
157a Large-Diameter Hole
157b Small-Diameter Hole
157c Step Portion
157d Tapered Portion
158 Second Hole Diameter Restriction Portion
159 Separation Elastic Body
160 Second Flow Control Valve
170 Third Flow Control Valve
200 Steering Device
201 Dust Boot
210 Damper
211 Inner Chamber Forming Body
211a External Thread Portion
212 Oil Supply Port
213 Accumulator Housing Portion
214 Accumulator
215, 216 Wall Forming Body
217 Inner Chamber
218 Return Elastic Body
218a Backing Plate
221a, 221b Buffer
222a, 222b Sliding Bush
223a, 223b Seal Ring
224a, 224b Dust Seal
230 Integral Displacement Body
231 Fixing Sleeve
240 Flow Control Valve
241 Valve Support
242 Seal Ring

What is claimed is:

1. A flow control valve provided at a flow path, in which fluid flows, to control a flow of the fluid by causing the fluid to flow with a limitation on the flow of the fluid, comprising:
a first flow body including a first flow hole through which the fluid flows;
a second flow body arranged so as to face the first flow body and including a second flow hole through which the fluid flows; and
a separation elastic body that produces an elastic force of separating the first flow body and the second flow body from a position at which the first flow body and the second flow body contact each other,
wherein at least one of the first flow body or the second flow body includes a hole diameter restriction portion that closes at least part of at least one of the second flow hole or the first flow hole when the first flow body and the second flow body contact each other.

2. The flow control valve according to claim 1, wherein the hole diameter restriction portion is provided only at one of the first flow body or the second flow body.

3. The flow control valve according to claim 1, wherein the hole diameter restriction portion is provided at each of the first flow body and the second flow body.

4. The flow control valve according to claim 1, wherein the hole diameter restriction portion is formed so as to fully close at least one of the second flow hole or the first flow hole.

5. The flow control valve according to claim 1, further comprising:
a second flow body housing portion that movably houses the second flow body on a second flow body side with respect to the first flow body,
wherein the separation elastic body is provided between the first flow body and the second flow body in the second flow body housing portion.

6. The flow control valve according to claim 1, wherein the second flow body is, at an opening of the second flow hole on a side opposite to the first flow body, formed in such a tapered shape that a hole size decreases from an opening side toward a far side.

7. The flow control valve according to claim 1, further comprising:
a one-way valve that causes the fluid to flow in a flow path different from the first flow body and the second flow body,
wherein the one-way valve allows the flow of the fluid from a first flow body side to a second flow body side, and blocks the flow of the fluid from the second flow body side to the first flow body side.

8. The flow control valve according to claim 1, further comprising:
a flow restriction valve that causes the fluid to flow with a limitation on the flow of the fluid in a flow path different from the first flow body and the second flow body, and
the flow restriction valve causes the fluid to flow with the limitation on the flow of the fluid between the first flow body side and the second flow body side.

9. A damper including an inner chamber forming body forming an inner chamber housing fluid in a liquid-tight manner and damping external force received by the fluid by limiting a flow of the fluid, comprising:
the flow control valve according to claim 1,
wherein the flow control valve causes the fluid to flow with the limitation on the flow of the fluid.

10. The damper according to claim 9, further comprising:
a return elastic body that provides an elastic force of causing the fluid to flow from the first flow body side to the second flow body side in the flow control valve,
wherein the flow control valve is, in the inner chamber, provided displaceable relative to the inner chamber, and
the return elastic body provides the elastic force to one of the inner chamber forming body or the flow control valve to displace the one of the inner chamber forming body or the flow control valve relative to the other one of the inner chamber forming body or the flow control valve.

11. The damper according to claim 10, further comprising:
- an integral displacement body that displaces integrally with the flow control valve relative to the inner chamber,
- wherein the inner chamber forming body is formed in a solid bar shape or a tubular shape,
- the inner chamber is formed in a circular-ring tubular shape outside the inner chamber forming body,
- the flow control valve is formed at a ring-shaped valve support to be fitted in the circular-ring tubular inner chamber, and
- the integral displacement body is formed in a tubular shape slidably fitted onto the inner chamber forming body.

12. The damper according to claim 10, further comprising:
- an integral displacement body that displaces integrally with the flow control valve relative to the inner chamber,
- wherein the inner chamber forming body is formed in a tubular shape,
- the inner chamber is formed in a circular-ring tubular shape inside the inner chamber forming body,
- the flow control valve is formed at a ring-shaped valve support to be fitted in the circular-ring tubular inner chamber, and
- the integral displacement body is formed in a solid bar shape or a tubular shape to be slidably fitted in the inner chamber forming body.

13. A steering device including:
- a steering shaft formed so as to extend in a bar shape and rotated by operation of a steering wheel,
- a rack bar formed so as to extend in a rod shape and converting rotary motion of the steering shaft into reciprocating motion in an axis direction to transmit the reciprocating motion,
- an intermediate coupling body coupled to each end portion of the rack bar to directly or indirectly couple a wheel targeted for steering to the each end portion,
- a rack housing covering the rack bar, and
- the damper according to claim 9,
- wherein the damper is provided between the rack housing and the rack bar or the intermediate coupling body to absorb impact from the wheel.

14. A steering device, including:
- a steering shaft formed so as to extend in a bar shape and rotated by operation of a steering wheel,
- a rack bar formed so as to extend in a rod shape and converting rotary motion of the steering shaft into reciprocating motion in an axis direction to transmit the reciprocating motion,
- an intermediate coupling body coupled to each end portion of the rack bar to directly or indirectly couple a wheel targeted for steering to the each end portion,
- a rack housing covering the rack bar, and
- the damper according to claim 11,
- wherein the damper is provided between the rack housing and the rack bar or the intermediate coupling body to absorb impact from the wheel,
- the inner chamber forming body is formed at the intermediate coupling body, and
- the integral displacement body is formed at such a position that the integral displacement body contacts or separates from the rack housing by the reciprocating motion of the rack bar.

15. A steering device including:
- a steering shaft formed so as to extend in a bar shape and rotated by operation of a steering wheel,
- a rack bar formed so as to extend in a rod shape and converting rotary motion of the steering shaft into reciprocating motion in an axis direction to transmit the reciprocating motion,
- an intermediate coupling body coupled to each end portion of the rack bar to directly or indirectly couple a wheel targeted for steering to the each end portion,
- a rack housing covering the rack bar, and
- the damper according to claim 12,
- wherein the damper is provided between the rack housing and the rack bar or the intermediate coupling body to absorb impact from the wheel,
- the inner chamber forming body is formed at an end portion of the rack housing, and
- the rack bar or the intermediate coupling body penetrates the integral displacement body, and the integral displacement body is formed at such a position that the rack bar or the intermediate coupling body contacts or separates from the integral displacement body by the reciprocating motion of the rack bar.

* * * * *